United States Patent
Ikeda

(10) Patent No.: US 8,135,209 B2
(45) Date of Patent: Mar. 13, 2012

(54) ARTICULATED OBJECT POSITION AND POSTURE ESTIMATION DEVICE, METHOD AND PROGRAM

(75) Inventor: Hiroo Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 1099 days.

(21) Appl. No.: 11/988,543

(22) PCT Filed: Jul. 18, 2006

(86) PCT No.: PCT/JP2006/314161
§ 371 (c)(1),
(2), (4) Date: Jan. 10, 2008

(87) PCT Pub. No.: WO2007/010893
PCT Pub. Date: Jan. 25, 2007

(65) Prior Publication Data
US 2009/0080780 A1   Mar. 26, 2009

(30) Foreign Application Priority Data
Jul. 19, 2005   (JP) .................................. 2005-208240

(51) Int. Cl.
*G06K 9/00* (2006.01)
(52) U.S. Cl. ......................... 382/154; 382/224; 382/103
(58) Field of Classification Search .................. None
See application file for complete search history.

(56) References Cited

U.S. PATENT DOCUMENTS

| | | | | |
|---|---|---|---|---|
| 7,450,736 B2 * | 11/2008 | Yang et al. | ..................... | 382/103 |
| 7,728,839 B2 * | 6/2010 | Yang et al. | ..................... | 345/474 |
| 7,831,087 B2 * | 11/2010 | Harville | ......................... | 382/154 |
| 7,925,081 B2 * | 4/2011 | Gupta et al. | ................... | 382/159 |
| 7,940,960 B2 * | 5/2011 | Okada | ........................... | 382/103 |
| 8,023,726 B2 * | 9/2011 | Sundaresan et al. | ......... | 382/154 |
| 2010/0111370 A1 * | 5/2010 | Black et al. | ................... | 382/111 |

FOREIGN PATENT DOCUMENTS

JP   2-176878   7/1990

(Continued)

OTHER PUBLICATIONS

Bowden et al. (1998) "Reconstructing 3d pose and motion from a single camera view." Proc. 1998 British Machine Vision Conf., pp. 904-913.*

(Continued)

*Primary Examiner* — Bhavesh Mehta
*Assistant Examiner* — Barry Drennan
(74) *Attorney, Agent, or Firm* — Foley & Lardner LLP

(57) ABSTRACT

An object is to provide an articulated object position and posture estimation device with reduced calculation cost of model fitting for estimating position and posture and with improved estimation speed. A posture model storage section 2 stores data concerning to a posture model with low-dimensional parameters under movement restraint. The low-dimensional parameters are obtained by performing a principal component analysis on time-series postures of an articulated object frame model corresponding to a predetermined limited movement of an articulated object such as human body. A human body position and posture estimation device 101 generates a image of each posture of the articulated object frame model within postures which can be taken by the posture model in a human body model image generating section 4, performs a matching with an estimation target articulated object image in a position and posture estimation section 10, and thus, estimates a posture.

30 Claims, 14 Drawing Sheets

FOREIGN PATENT DOCUMENTS

| | | |
|---|---|---|
| JP | 7-302341 | 11/1995 |
| JP | 8-106519 | 4/1996 |
| JP | 10-302070 | 11/1998 |
| JP | 2001-056861 A | 2/2001 |
| JP | 2002-063567 A | 2/2002 |
| JP | 2003-109015 A | 4/2003 |
| JP | 2003-150977 A | 5/2003 |
| JP | 2004-213589 A | 7/2004 |

OTHER PUBLICATIONS

Kameda et al. (Nov. 1993) "Three dimensional pose estimation of an articulated object from its silhouette image." Proc. 1993 Asian Conf. on Computer Vision, pp. 612-615.*

Kameda et al. (1995) "Three dimensional motion estimation of a human body using a difference image sequence." Proc. 1995 Asian Conf. on Computer Vision.*

Lee et al. (May 2004) "Human upper body pose estimation in static images." Proc. 2004 European Conf. on Computer Vision, LNCS 3022 pp. 126-138.*

Orrite-Uruñuela et al. (Aug. 2004) "2d silhouette and 3d skeletal models for human detection and tracking." Proc. 17$^{th}$ Int'l Conf. on Pattern Recognition, vol. 4 pp. 244-247.*

Qiu et al. (2005) "Estimating articulated human pose from video using shape context." 2005 IEEE Int'l Symp. on Signal Processing and Information Technology, pp. 583-588.*

Shimada et al. (Jul. 2001) "Real-time 3d hand posture estimation based on 2d appearance retrieval using monocular camera." Proc. 2001 IEEE ICCV Workshop on Recognition, Analysis, and Tracking of Faces and Gestures in Real-Time Systems, pp. 23-30.*

Y. Kameda et al., "A Pose Estimation Method for an Articulated Object from its Silhouette Image," The Transactions of the Institute of Electronics, Information and Communication Engineers D-II., vol. J79-D-II, No. 1, Jan. 1996, pp. 26-35.

* cited by examiner

Fig. 3
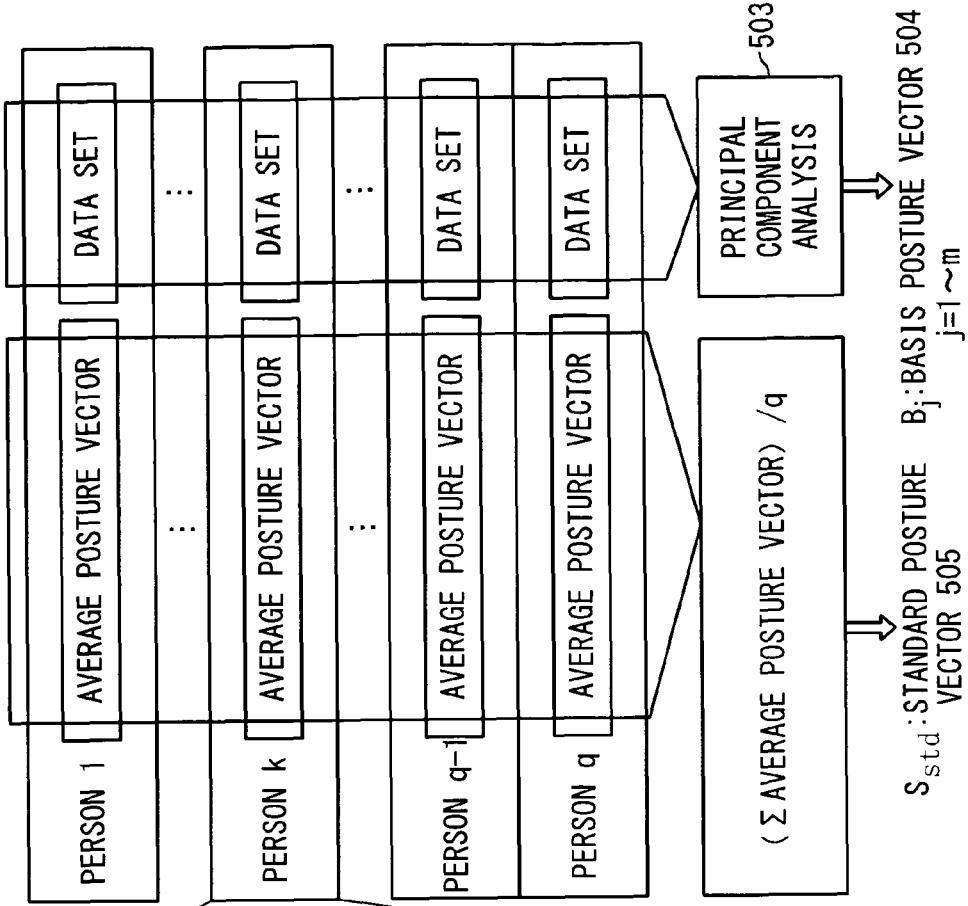
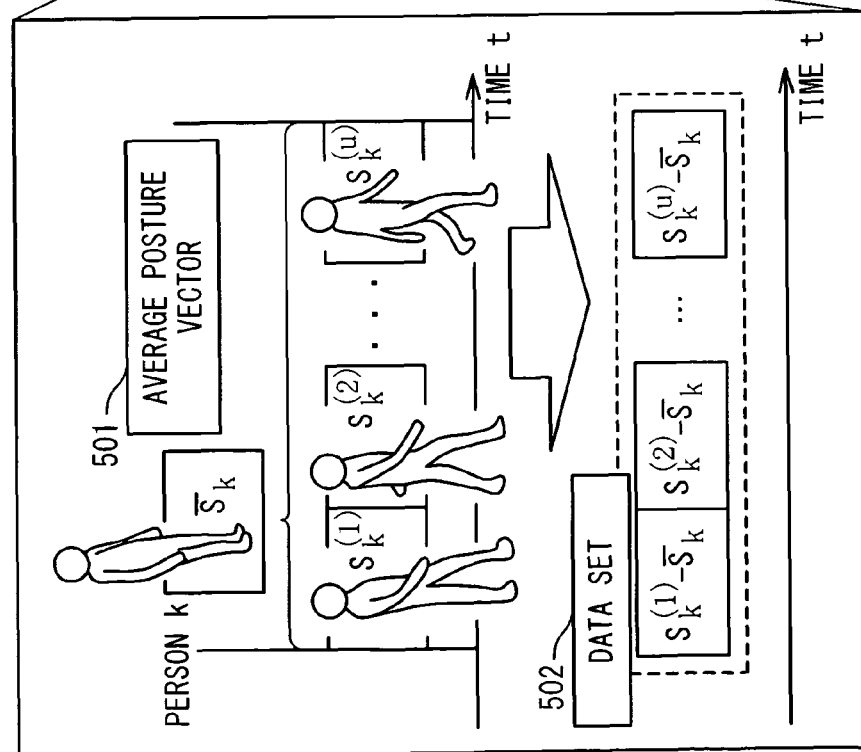

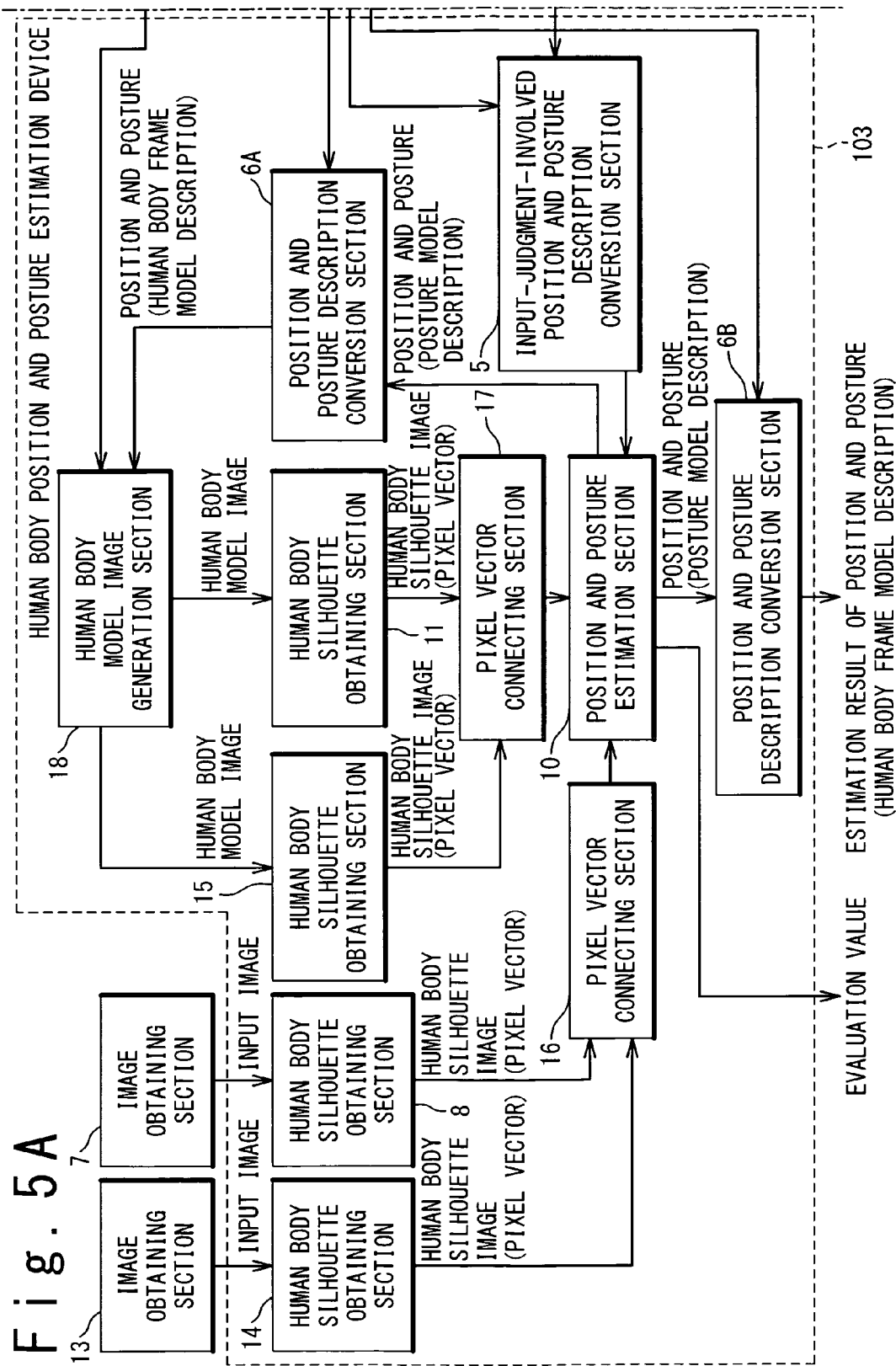

Fig. 8
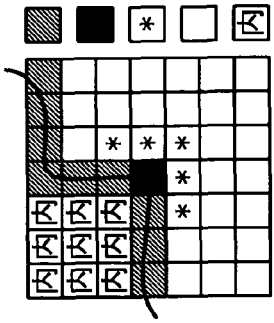
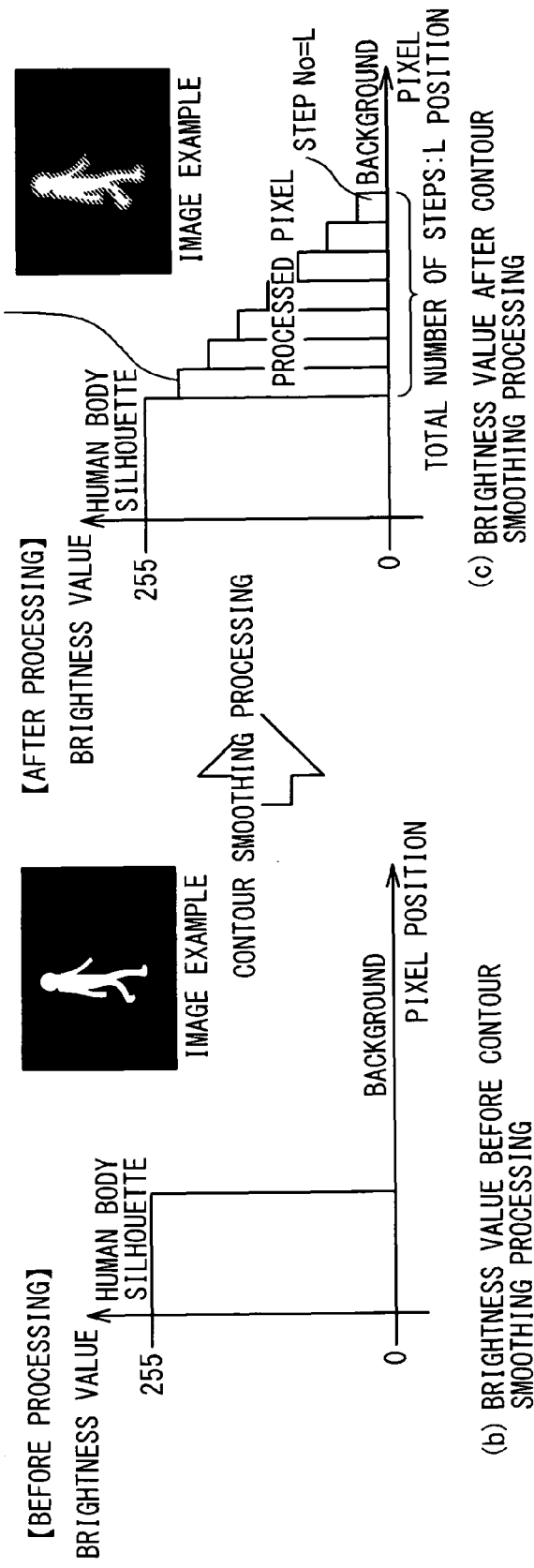

ARTICULATED OBJECT POSITION AND POSTURE ESTIMATION DEVICE, METHOD AND PROGRAM

This application is the National Phase of PCT/JP2006/314161, filed Jul. 18, 2006, which claims priority to Japanese Application No. 2005-208240, filed Jul. 19, 2005, the disclosure of which are hereby incorporated by reference in their entirety.

TECHNICAL FIELD

The present invention relates to an articulated object position and posture estimation device, an articulated object position and posture estimation method and an articulated object position and posture estimation program, and more particularly to an articulated object position and posture estimation device, an articulated object position and posture estimation method and an articulated object position and posture estimation program which use an articulated object model.

BACKGROUND ART

Conventionally, art for estimating position and posture of articulated object estimate three-dimensional position and posture of an articulated object, for example, a human object, in an image obtained from a monocular camera, its accumulated video, or the like. The art for estimating position and posture of articulated object are used for human behavior analysis and suspicious individual detection in a monitoring field, avatar motion synthesis for a virtual reality world, a remote control interface of a machine, or the like. One example of the conventional art for estimating position and posture of articulated object is disclosed by Yoshinari KAMEDA, Michihiko MINOH, Katsuo IKEDA in "A Pose Estimation Method for an Articulated Object from its Silhouette Image" (The Transactions of the Institute of Electronics, Information and Communication Engineers D-II. Vol. J79-D-II, No. 1, January 1996, pp. 26-35.).

The art for estimating position and posture of articulated object disclosed in "A Pose Estimation Method for an Articulated Object from its Silhouette Image" is art for estimating three-dimensional position and posture for a two-dimensional image of a human body (multi-articulated object) obtained from a monocular camera, and has the following elements and operations. A human body silhouette image is obtained for the input image obtained from the monocular camera. The position and posture of a human body (multi-articulated object) model which reflects an accurate shape of the estimation target is manipulated to obtain a human body silhouette image of the model. The position and posture of the model is searched when the both human body silhouette images match with each other. The three-dimensional position and posture of the human body (multi-articulated object) in the input image are obtained from the three-dimensional position and posture of the model after matched. In the search processing, sub search processing for each portion is performed by using a tree structure of the human body (multi-articulated object) model, thereby throughput for the search is reduced more than in a method in which search processing is performed simultaneously for all the portions.

As for the art for estimating position and posture of articulated object disclosed in "A Pose Estimation Method for an Articulated Object from its Silhouette Image", the number of combinations of parameters for manipulating the articulated object model is very large, which results in very large calculation costs in model fitting for estimating the position and posture of the articulated object. Since, it is intended to estimate every postures of the articulated object.

To adapt the conventional art for estimating position and posture of articulated object to real time processing faces some problems to be solved.

Other art related to the art for estimating position and posture of articulated object includes the followings.

Japanese Laid Open Patent Application (JP-A-Heisei, 7-302341) discloses a posture detection device for detecting the posture of a human body by using genetic algorithms.

Japanese Laid Open Patent Application (JP-P 2002-63567A) discloses an object position and posture estimation device for estimating the position and posture of a target object by using color data on the surface of the target object.

Japanese Laid Open Patent Application (JP-P 2003-109015A) discloses a body movement measurement method for estimating a change in the posture of a hidden body portion from a change in the posture of a measurable body portion by using subordinate relation between variables indicating the postures.

Japanese Laid Open Patent Application (JP-P 2003-150977A) discloses a system that permits expressing time-series signals of articulate angles of a three-dimensional model with a small number of parameters. This system obtains posture parameters, from a person in a two-dimensional image, of each object constituting the three-dimensional model of a human body. From the posture parameters obtained, independent components of movement are acquired. By utilizing a space of the acquired independent components of movement, a movement of the three-dimensional model is generated. From the generated movement of the three-dimensional model, a two-dimensional dynamic image is generated.

Japanese Laid Open Patent Application (JP-P 2004-213589A) discloses a posture estimation device capable of detecting a posture in a short time without being influenced by the brightness of an input image. This device includes a matching image generation section and a pattern matching section. The matching image generation section binarizes each pixel of the input image of a specific portion, and further specifies a component whose size is within a set range to obtain a binary image. The pattern matching section detects the posture by verifying the binary image with a predetermined template.

DISCLOSURE OF INVENTION

An object of the present invention is to provide an articulated object position and posture estimation device and a method, which are capable of drastically reducing calculation cost involved in model fitting and of improving estimation speed.

Another object of the present invention is to provide an articulated object position and posture estimation device and a method, which are capable of efficiently estimating a posture of an articulated object within range of limited movement.

An articulated object position and posture estimation device according to the present invention includes a storage section and a position and posture estimation device. The storage section stores data concerning to a posture model with low-dimensional parameters under movement restraint. The low-dimensional parameters are obtained by performing principal component analysis on time-series postures of an articulated object frame model. The time-series postures correspond to a predetermined limited movement of an articulated object. The position and posture estimation device generates an image of each posture of the articulated object frame model within postures which can be taken by the posture model and performs matching with an estimation target articulated object image to estimate a posture.

In the articulated object position and posture estimation device according to the present invention, the data concerning to the posture model includes an average posture of the time-series postures and basis posture vectors as eigenvectors obtained in the principal component analysis.

In the articulated object position and posture estimation device according to the present invention, the position and posture estimation device includes a conversion section, a model image generation section, a silhouette obtaining section, and a position and posture estimation section. The conversion section converts posture description according to the posture model into posture description according to the articulated object frame model. The model image generation section generates an image of the articulated object frame model adjusted to a posture indicated by the posture description converted by the conversion section. The silhouette obtaining section, from the image of the articulated object flame model generated by the model image generation section, generates the image used for the matching with the estimation target articulated object image. The position and posture estimation section changes a posture description according to the posture model to be given to the conversion section such that the image generated by the silhouette obtaining section and the estimation target articulated object image match each other.

The articulated object position and posture estimation device according to the present invention includes a position and posture initial value storage section. The position and posture initial value storage section stores a position and posture estimation initial value which is used by the position and posture estimation section.

In the articulated object position and posture estimation device according to the present invention, the position and posture estimation device includes an input-judgment-involved position and posture description conversion section. The input-judgment-involved position and posture description conversion section obtains the position and posture estimation initial value from the position and posture initial value storage section, and judges its description type. In case of the posture description according to the posture model, the input-judgment-involved position and posture description conversion section outputs the position and posture estimation initial value with no conversion to the position and posture estimation section. In case of the posture description according to the articulated object frame model, the input-judgment-involved position and posture description conversion section outputs the position and posture estimation initial value to the position and posture estimation section after converting the description type into the posture description according to the posture model.

In the articulated object position and posture estimation device according to the present invention, the position and posture estimation device uses a plurality of images which are obtained by imaging an estimation target articulated object from different viewpoints as the estimation target articulated object image, and estimates the posture by matching the plurality of images with a plurality of images of the articulated object frame model generated for the viewpoints.

In the articulated object position and posture estimation device according to the present invention, the position and posture estimation device includes a contour smoothing processing section. The contour smoothing processing section performs blurring processing on contour portions of the articulated object images appearing in the both images on which the matching is performed.

An articulated object position and posture estimation device according to the present invention includes: an articulated object frame model storage section, a posture model storage sections, a position and posture initial value storage section, an image obtaining section, a first articulated object silhouette obtaining section, an input-judgment-involved position and posture description conversion section, an articulated object model image generation section, a second articulated object silhouette obtaining section, a position and posture estimation section, and a position and posture description conversion section. The articulated object frame model storage section stores as a physique parameter a size of rigid body of each portion of an articulated frame model provided by modeling an articulated object based on a multi-articulated tree structure with rigid bodies, such as spheres or cylinders. The posture model storage section stores basis posture vectors and a standard posture vector of a posture model modeled with low-dimensional parameters under movement restraint obtained through principal component analysis on time-series postures of the articulated object frame model. The time-series postures correspond to a predetermined limited movement of a plurality of articulated objects. The position and posture initial value storage section stores a position and posture estimation initial value. The image obtaining section obtains an input image of a target articulated object. The first articulated object silhouette obtaining section obtains an articulated object silhouette image (pixel vector) from the input image. The input-judgment-involved position and posture description conversion section obtains the position and posture estimation initial value from the position and posture initial value storage section and judges its description type. In case of a posture model description, the input-judgment-involved position and posture description conversion section does not convert the description type. In case of an articulated object frame model description, the input-judgment-involved position and posture description conversion section converts the description type into the posture model description by using the posture model. The articulated object model image generation section, based on the position and posture (posture model description), generates from the posture model and the articulated object frame model an articulated object model image adjusted to camera parameters of the image obtaining section. The second articulated object silhouette obtaining section obtains an articulated object silhouette image (pixel vector) from the articulated object model image. The position and posture estimation section calculates an evaluation function based on the two pixel vectors inputted, repeats an estimation of the position and posture (posture model description) through an optimization method such that a value of the evaluation function is minimized, and outputs final estimation results as an evaluation value and the position and posture (posture model description). The evaluation function is expressed by the square of the magnitude of difference between the pixel vectors. The position and posture description conversion section converts the position and posture (posture model description) as estimation result into the articulated object frame model description.

An articulated object position and posture estimation device according to the present invention includes: an articulated object frame model storage section, a posture model storage section, an position and posture initial value storage section, a first image obtaining section, a second image obtaining section, a first articulated object silhouette obtaining section, a second articulated object silhouette obtaining section, a first pixel vector connecting section, an input-judgment-involved position and posture description conversion section, an articulated object model image generation section, a third articulated object silhouette obtaining section, a fourth articulated object silhouette obtaining section, a second pixel vector connecting section, a position and posture estimation section, and a position and posture description conversion section. The articulated object frame model storage section stores as a physique parameter a size of rigid body of each portion of an articulated frame model obtained by modeling an articulated object with a multi-articulated tree structure of rigid bodies, such as spheres or cylinders. The posture model storage section stores basis posture vectors and a standard posture vector of a posture model modeled with low-dimensional parameters under movement restraint obtained through principal component analysis on time-series postures of an articulated object frame model in a predetermined limited movement of a plurality of articulated objects. The position and posture initial value storage section stores a position and posture estimation initial value. The first image obtaining section obtains an input image of a target articulated object. The second image obtaining section obtains another input image of the target articulated object. The first articulated object silhouette obtaining section obtains an articulated object silhouette image (pixel vector) from the input image from the first image obtaining section. The second articulated object silhouette obtaining section obtains an articulated object silhouette image (pixel vector) from the input image from the second image obtaining section. The first pixel vector connecting section connects the two articulated object silhouette pixel vectors from a side of the image obtaining sections in a predetermined order to provide a pixel vector. The input-judgment-involved position and posture description conversion section obtains the position and posture estimation initial value from the position and posture initial value storage section and judges its description type. In case of a posture model description, the input-judgment-involved position and posture description conversion section does not convert the description type. In case of an articulated object frame model description, the input-judgment-involved position and posture description conversion section converts the description type into the posture model description by using the posture model. The articulated object model image generation section, based on the position and posture (posture model description), generates from the posture model and the articulated object frame model articulated object model images adjusted to camera parameters of the two image obtaining sections. The third articulated object silhouette obtaining section obtains an articulated object silhouette image (pixel vector) from one of the articulate object model images. The fourth articulated object silhouette obtaining section obtains an articulated object silhouette image (pixel vector) from the other one of the articulated object model images. The second pixel vector connecting section connects the two articulated object silhouette pixel vectors from a side of the articulated object model image generation sections in the predetermined order to provide a pixel vector. The position and posture estimation section calculates an evaluation function based on the two pixel vectors inputted, repeats estimation of the position and posture (posture model description) through an optimization method such that a value of evaluation function is minimized, and outputs final estimation results as an evaluation value and the position and posture (posture model description). The evaluation function is expressed by the square of the magnitude of the difference between the pixel vectors. The position and posture description conversion section converts the position and posture (posture model description) as an estimation result into the articulated object frame model description.

An articulated object position and posture estimation device according to the present invention includes: an articulated object frame model storage section, a posture model storage section, a position and posture initial value storage section, an image obtaining section, a first articulated object silhouette obtaining section, a first contour smoothing processing section, an input-judgment-involved position and posture description conversion section, an articulated object model image generation section, a second articulated object silhouette obtaining section, a second contour smoothing processing section, a position and posture estimation section, and a position and posture description conversion section. The articulated object frame model storage section stores as a physique parameter a size of rigid body of each portion of an articulated frame model obtained by modeling an articulated object with a multi-articulated tree structure of rigid bodies, such as spheres or cylinders. The posture model storage section stores basis posture vectors and a standard posture vector of a posture model modeled with low-dimensional parameters under movement restraint obtained through principal component analysis on time-series postures of an articulated object frame model in a predetermined limited movement of a plurality of articulated objects. The position and posture initial value storage section stores a position and posture estimation initial value. The image obtaining section obtains an input image of a target articulated object. The first articulated object silhouette obtaining section obtains an articulated object silhouette image (pixel vector) from the input image. The first contour smoothing processing section performs blurring processing on the articulated object silhouette image to generate a processed image (pixel vector). The input-judgment-involved position and posture description conversion section obtains the position and posture estimation initial value from the position and posture initial value storage section and judges its description type. In case of a posture model description, the input-judgment-involved position and posture description conversion section does not convert the description type. In case of an articulated object frame model description, the input-judgment-involved position and posture description conversion section converts the description type into the posture model description by using the posture model. The articulated object model image generation section, based on the position and posture (posture model description), generates from the posture model and the articulated object frame model an articulated object model image adjusted to camera parameters of the image obtaining section. The second articulated object silhouette obtaining section obtains an articulated object silhouette image (pixel vector) from the articulated object model image. The second contour smoothing processing section performs blurring processing on the articulated object silhouette image to generate a processed image (pixel vector). The position and posture estimation section calculates an evaluation function based on the two pixel vectors inputted, repeats estimation of the position and posture (posture model description) through an optimization method such that a value of evaluation function is minimized, and outputs final estimation results as an evaluation value and the position and posture (posture model description). The evaluation function is expressed by the square of the magnitude of the difference between the pixel-vectors. The position and posture description conversion section converts the position and posture (posture model description) as an estimation result into the articulated object frame model description.

In an articulated object position and posture estimation method according to the present invention, a position and posture estimation device reads out from a storage section a data concerning to a posture model with low-dimensional parameters under movement restraint obtained through principal component analysis on time-series postures of an articulated object frame model. The time-series postures correspond to a predetermined limited movement of an articulated object frame model. The position and posture estimation device generates an image of each posture of the articulated object frame model within postures which can be taken by the posture model and performs matching with an estimation target articulated object image to estimate a posture.

In the articulated object position and posture estimation method according to the present invention, the data concerning to the posture model includes an average posture of the time-series postures and basis posture vectors as eigenvectors obtained in the principal component analysis.

In the articulated object position and posture estimation method according to the present invention, the position and posture estimation device converts a posture description according to the posture model into a posture description according to the articulated frame model; generates an image of the articulated object frame model adjusted to a posture indicated by the converted posture description; generates, from the generated image of the articulated object flame model, an image used for the matching with the estimation target articulated object image; and changes the posture description according to the posture model such that the generated image and the estimation target articulated object image match each other.

In the articulated object position and posture estimation method according to the present invention, the position and posture estimation device reads in a position and posture estimation initial value from the position and posture initial value storage section.

In the articulated object position and posture estimation method according to the present invention, the position and posture estimation device obtains the position and posture estimation initial value from the position and posture initial value storage section and judges its description type. In case of the posture description according to the articulated object frame model, the position and posture estimation device coverts the description type into the posture description according to the posture model.

In the articulated object position and posture estimation method according to the present invention, the position and posture estimation device uses as the estimation target articulated object image a plurality of images obtained by imaging an estimation target articulated object from different viewpoints and estimates a posture through matching between the plurality of images and a plurality of images of the articulated object frame model generated for the viewpoints.

In the articulated object position and posture estimation method according to the present invention, the position and posture estimation device performs a blurring processing on contour portions of the articulated object images appearing in the both images used in the matching.

The number of combinations of parameters representing the position and posture of an articulated object model is very large when it is intended to estimate every postures of an articulated object. However, estimating the posture of the articulated object within range of limited movement such as "movement for walking" or "movement for grasping an object" reduces the number of combinations of parameters. Since postures in the limited movement exhibit distribution according to a rule, a principal component analysis based on time-series postures of the limited movement permits constructing a posture model with a reduced number of parameters. Posture description according to a posture model and posture description according to an articulated object model can be converted into each other. Thus, by changing the posture description according to the posture model and by converting the changed posture description into the posture description according to the articulated object model to adjust the posture of the articulated object model, the posture of the articulated object model can be adjusted through the posture model with a small number of parameters. As a result, calculation costs involved in model fitting can be reduced, and the estimation speed can be improved.

A first advantage of the present invention is that calculation cost involved in model fitting for estimating the position and posture of an articulated object can be reduced, and that the estimation speed can be improved.

Because the posture of the articulated object is controlled through a posture model with low-dimensional parameters under movement restraint, an articulated model image is generated and matched with an estimation target articulated object image to estimate the posture.

A second advantage of the present invention is that the estimation accuracy can be improved for an articulated object silhouette image in which self-occlusion in monocular view occurs.

Because the use of the posture model under movement restraint induces estimation for a self-occlusion portion based on estimation for a non-self-occlusion portion, resulting in movement restraint and limitation of estimation candidates of position and posture.

BRIEF DESCRIPTION OF DRAWINGS

FIG. 3 shows an example of generated posture model according to the first exemplary embodiment of the present invention;

FIGS. 5A and 5B shows a block diagram according to a second exemplary embodiment of the present invention;

FIG. 8 is an explanation drawing of a contour smoothing processing according to the third exemplary embodiment of the present invention, (a) illustrates contour smoothing processing for a noted contour pixel, (b) shows brightness values before the contour smoothing processing and (c) shows brightness values after the contour smoothing processing;

BEST MODE FOR CARRYING OUT THE INVENTION

Next, exemplary embodiments of the present invention will be described in detail with reference to the drawings.

First Exemplary Embodiment

Figure 1:
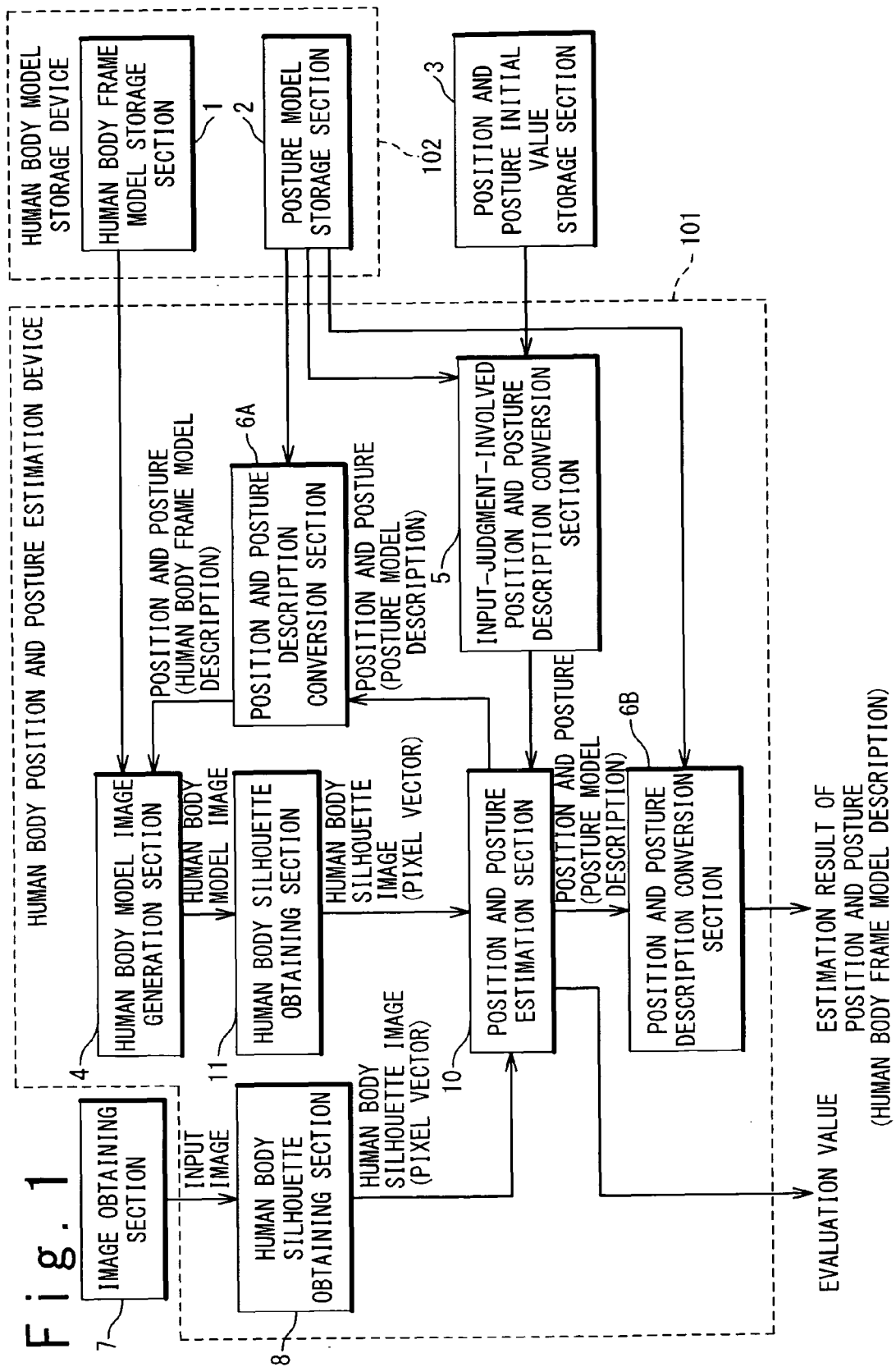
FIG. 1 is a block diagram according to a first exemplary embodiment of the present invention.

Referring to FIG. 1, an articulated object position and posture estimation device according to a first exemplary embodiment of the present invention includes a image obtaining section 7, a human body position and posture estimation device 101, a position and posture initial value storage section 3 and a human body model storage device 102. The image obtaining section 7 is a camera or the like that obtains an image of a person as posture estimation target. The human body position and posture estimation device 101 estimates position and posture for the person image obtained by the image obtaining section 7 and outputs results of the estimation. The position and posture initial value storage section 3 stores an position and posture estimation initial value used by the human body position and posture estimation device 101 to estimate the position and posture. The human body model storage device 102 stores data of a human body model and the data are used by the human body position and posture estimation device 101 to estimate the position and posture.

The data of the human body model stored in the human body model storage device 102 includes data concerning to a human body frame model and data concerning to a posture model. The former is stored in a human body frame model storage section 1, and the latter is stored in a posture model storage section 2. Hereinafter, the human body frame model and the posture model will be described.

Figure 2:
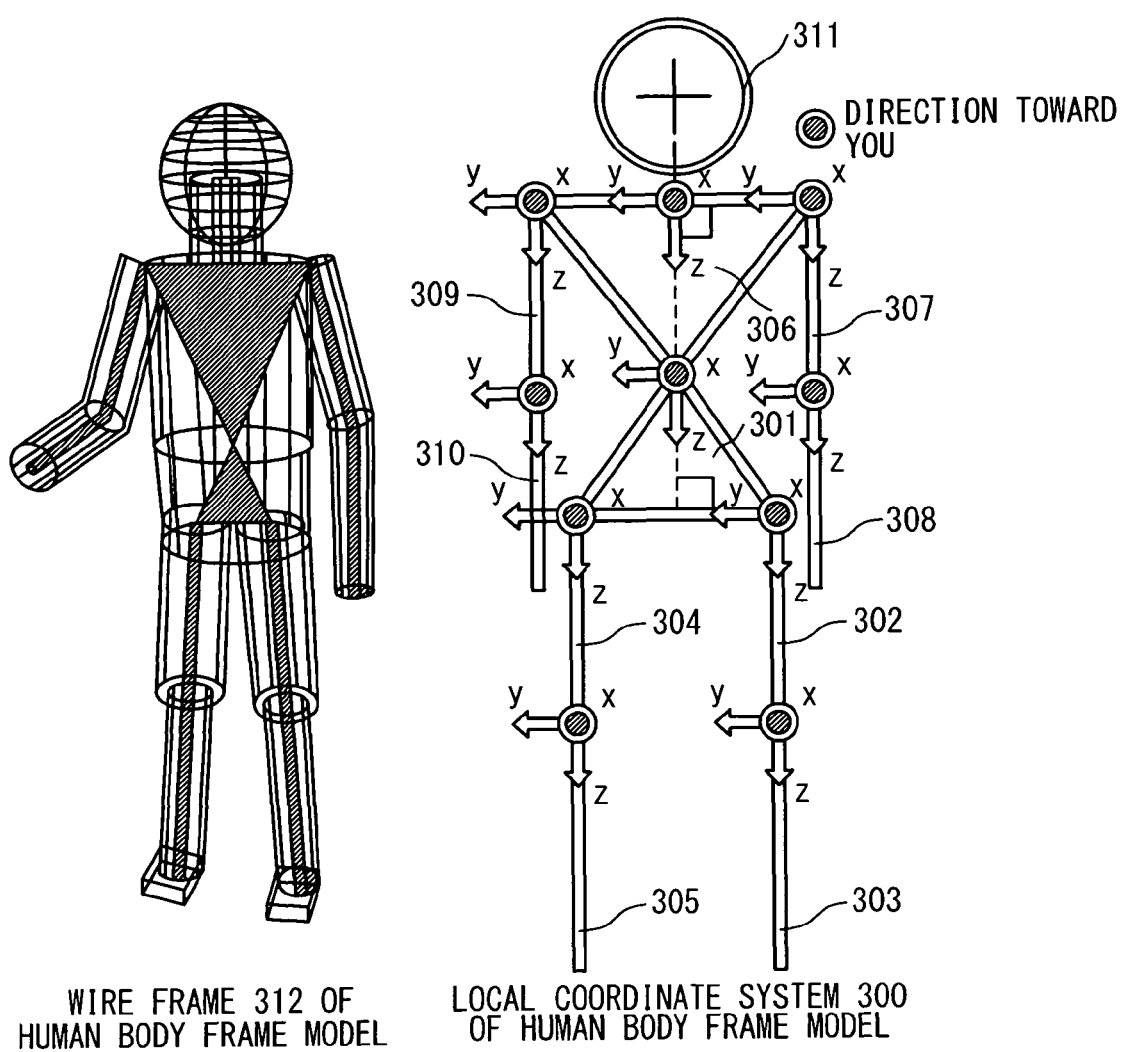
FIG. 2 is an explanation drawing of a human body frame model according to the first exemplary embodiment of the present invention.

The human body frame model is obtained by modeling a human body with a multi-articulated tree structure of rigid bodies, such as spheres or cylinders. FIG. 2 shows a wire frame 312 and a local coordinate system 300 of the human body frame model. It should be noted that the human body frame model is actually a solid model. The wire frame 312 of the human body frame model of FIG. 2 is shown for a better visual understanding of a relation between the human body frame model and the local coordinate system 300.

The human body frame model shown in FIG. 2 is composed of total eleven portions 301 to 311. A shape and a size of each of the portions are digitized as physique parameters and stored in the human body frame model storage section 1. Moreover, as shown in the local coordinate system 300, a local coordinate system of each of the portions is set at its articulate position. Each portion is connected to another portion in parent-child relation and a posture of the portion as child is determined by three parameters of xyz-axis rotations based on the local coordinate system of the portion as parent. The uppermost portion of parent (root portion) is determined by three parameters of xyz-axis rotations based on a world coordinate system and its position (human body position) is determined by three parameters of xyz coordinate positions. Therefore, the position and posture of the human body frame model is indicated as follows.

The human body position p (position of the root portion) is indicated as a vector of:

$$p=(p_x, p_y, p_z) \tag{1}$$

The posture (articulate angle) of each of the portions is indicated as a vector of:

$$\theta_i=(\theta_{ix}, \theta_{iy}, \theta_{iz}) \; i=1\sim n \tag{2}$$

Here, n is the number of portions and i=1 represents the posture of the root portion.

Based on the equations (1) and (2), the position and posture of the human body frame model are indicated as a vector of:

$$x=(p, \theta_1, \theta_2, \ldots, \theta_n)^T \; i=1\sim n \tag{3}$$

This is referred to as position and posture according to the human body frame model description and written as position and posture (human body frame model description). Here, n is the number of portions and T represents transposition.

As for the human body frame model, the position and posture of the human body model is uniquely determined from the position and posture provided by the equation (3) and the physique parameters indicating the shape and size of each of the portions and stored in the human body frame model storage section 1.

Next, the posture model will be described.

The posture model is generated in the following manner through procedures shown in FIG. 3.

First, the human body position p and the root portion posture $\theta_1$ are eliminated from the position and posture (human body frame model description) of the equation (3) to provide a posture vector defined as:

$$s=(\theta_2, \theta_3, \ldots, \theta_n)^T \tag{4}$$

Here, n is the number of portions.

Next, time-series posture vectors $s_k^{(1)}, \ldots, s_k^{(u)}$ concerning to a predetermined movement performed by a person k are collected, and an average posture vector 501 is obtained for the time-series posture vectors. Here, the predetermined movement means a predetermined limited movement, such as movement for walking, movement for sitting, or movement for grasping an object. For example, when the predetermined movement is the movement for walking, the average posture vector 501 corresponds to the posture of the person k standing straight. Since the posture for standing straight differs from one person to another, the average posture vector 501 corresponds to a vector representing connection among arms and legs or the like according to the physique of the person k.

Next, in order to eliminate an individual posture offset, the average posture vector 501 is subtracted from each of the time-series posture vectors $s_k^{(1)}, \ldots, s_k^{(u)}$. As a result, a data set 502 is generated as posture vectors concerning to the predetermined movement described above and free from the influence of individual physique.

As described above, a set of an average posture vector 501 and a data set 502 is generated for each of a plurality of persons 1 to q.

Next, principal component analysis 503 is performed on the data sets 502 generated for the plurality of persons to obtain each basis posture vector $B_j$ 504 as an eigenvector. Variables $\theta_2$ to $\theta_n$ of the posture vectors are included in the data set 502, each of those is three-dimensional, and therefore, the number of the variables is 3(n−1). In the principal component analysis 503, from a multivariate data matrix composed of the 3 (n−1) of variables, a multivariate data matrix composed of 3(n−1) of synthetic variables orthogonal to each other is newly generated. These synthetic variables are referred to as principal components and expressed by weighted linear combinations of the original variables of the data set 502. The weights serve as the eigenvector.

On the other hand, an average of the average posture vectors 501 for the persons is obtained as a standard posture vector $S_{std}$ 505. The standard posture vector 505 may be an average of all the posture vectors before the average posture vector 501 is obtained.

When the number of principal components satisfying an accumulated contribution ratio determined in advance in view of balance between reproducibility of movement and reduction in dimension is m<3(n−1), the posture model is given by the next equation (5).

$$s(\lambda) = s_{std} + \sum_{j=1}^{m} \lambda_j B_j \quad m < 3(n-1) \tag{5}$$

Here, $S_{std}$ denotes the standard posture vector, $B_j$ denotes the basis posture vector (eigenvector), $\lambda_j$ denotes a coefficient of the basis posture vector, $\lambda_j$ denotes the number of basis posture vectors, and n denotes the number of portions.

The posture model given by the equation (5) is referred to as a posture model with low-dimensional parameters under movement restraint.

Applying the equation (4) to the equation (3) results in $x=(p, \theta_1, s^T)^T$. When $S_{std}$ and $B_j$ are known, s can be expressed as a variable of λ based on the equation (5), and therefore, the next equation (6) is derived.

$$x' = (p, \theta_1, \lambda_j)^T j = 1 \sim m \, m < 3(n-1) \tag{6}$$

The position and posture expressed by the above equation (6) is referred to as position and posture according to the posture model description and written as position and posture (posture model description). Each basis posture vector $B_j$ and the standard posture vector $S_{std}$ of the equation (5) are stored in the posture model storage section 2.

As described above, the posture model can be said to be a model expressing the posture of the human body frame model with low-dimensional parameters under movement restraint.

As for the position and posture, based on the equation (5), description conversion can be made between the position and posture (human body frame model description) and the position and posture (posture model description).

The human body frame model and the posture model have been described above.

Referring again to FIG. 1, the human body position and posture estimation device includes a human body model image generation section 4, human body silhouette obtaining sections 8 and 11; an input-judgment-involved position and posture description conversion section 5, position and posture description conversion sections 6A and 6B and a position and posture estimation section 10.

The position and posture description conversion section 6A converts the position and posture (posture model description) according to the equation (6) from the position and posture estimation section 10 into the position and posture (human body frame model description) according to the equation (3) and then outputs that to the human body model image generation section 4. The position and posture description conversion section 6A obtains the basis posture vectors and the standard posture vector of the posture model required for the conversion from the posture model storage section 2.

The human body model image generation section 4 generates the human body frame model based on the position and posture (human body frame model description) according to the equation (3) given from the position and posture description conversion section 6A and the physique parameters stored in the human body frame model storage section 1, generates a human body model image adjusted to camera parameters of the image obtaining section 7 from the human body frame model, and then outputs the human body model image to the human body silhouette obtaining section 11. Here, the camera parameters includes, for example, position of the camera relative to the origin of the world coordinate system (position of the origin of a camera coordinate system), posture of the camera based on the world coordinate system (xyz rotation angles), focal length of the camera, vertical angle of view of the camera, projection screen width onto two-dimensional image, projection screen height onto two-dimensional image and the like. These parameters are required for converting the three dimensional human body model existing in the world coordinate system into a projection two dimensional image viewed from the camera.

The human body silhouette obtaining section 8 performs processing, such as shading, background subtraction, binarization and labeling, on the image taken by the camera and inputted from the image obtaining section 7 to obtain a human body silhouette image (pixel vector). As a method for obtaining a human body silhouette image from a camera image, there are various other methods, which can be used arbitrarily. Similarly, the human body silhouette obtaining section 11 obtains a human body silhouette image (pixel vector) from the human body model image generated by the human body model image generation section 4.

The position and posture initial value storage section 3 stores the position and posture estimation initial value. The position and posture estimation initial value are described according to any of the posture model description and the human body frame model description.

The input-judgment-involved position and posture description conversion section 5 judges the description type of the position and posture estimation initial value from the position and posture initial value storage section 3. If the description type is the posture model description, the input-judgment-involved position and posture description conversion section 5 outputs the position and posture estimation initial value with no conversion to the position and posture estimation section 10. If the description type is the human body frame model description, the input-judgment-involved position and posture description conversion section 5 converts the description type into the posture model description by using the posture model equation (5) and then outputs the position and posture estimation initial value to the position and posture estimation section 10. The input-judgment-involved position and posture description conversion section 5 obtains the basis posture vectors and the standard posture vector of the posture model required for the conversion from the posture model storage section 2.

The position and posture estimation section 10 updates the human body frame model generated by the human body model image generation section 4 such that the human body silhouette image inputted from the human body silhouette obtaining section 11 matches with the human body silhouette image inputted from the human body silhouette obtaining section 8, and thereby, estimates the position and posture of the person corresponding to the human body silhouette image obtained by the human body silhouette obtaining section 8. More specifically, the position and posture estimation section 10 calculates an evaluation function from the two pixel vectors inputted from the human body silhouette obtaining sections 8 and 11, repeats an operation of updating the position and posture (posture model description) through an optimization method such that the evaluation function is minimized and of feeding the updated the position and posture to the position and posture description conversion section 6A, and outputs final estimation results as an evaluation value (value of the evaluation function) and the position and posture (posture model description). The position and posture estimation section 10 feeds, as initial position and posture, the position and posture fed from the input-judgment-involved position and posture description conversion section 5 to the position and posture description conversion section 6A. The evaluation function is, as indicated by equation (7), expressed by the square of the magnitude of the difference between the pixel vectors $$x'^{*}=\arg\min(|I_r-I_m(x')|^2) \quad (7)$$

Here, $I_r$ denotes the pixel vector from a side of the human body silhouette obtaining section 8 (image obtaining section side); and $I_m(x')$ denotes the pixel vector from a side of the human body silhouette obtaining section 11 (human body model image generation section side).

In the present exemplary embodiment, as the optimization method, not only a nonlinear least-squares method and but also other various methods can be used.

The position and posture description conversion section 6B converts, for the position and posture (posture model description) from the position and posture estimation section 10, the description type into the human body frame model description by using the posture model equation (5). The position and posture description conversion section 6B obtains the basis posture vectors and the standard posture vector of the posture model required for the conversion from the posture model storage section 2.

Figure 4A:
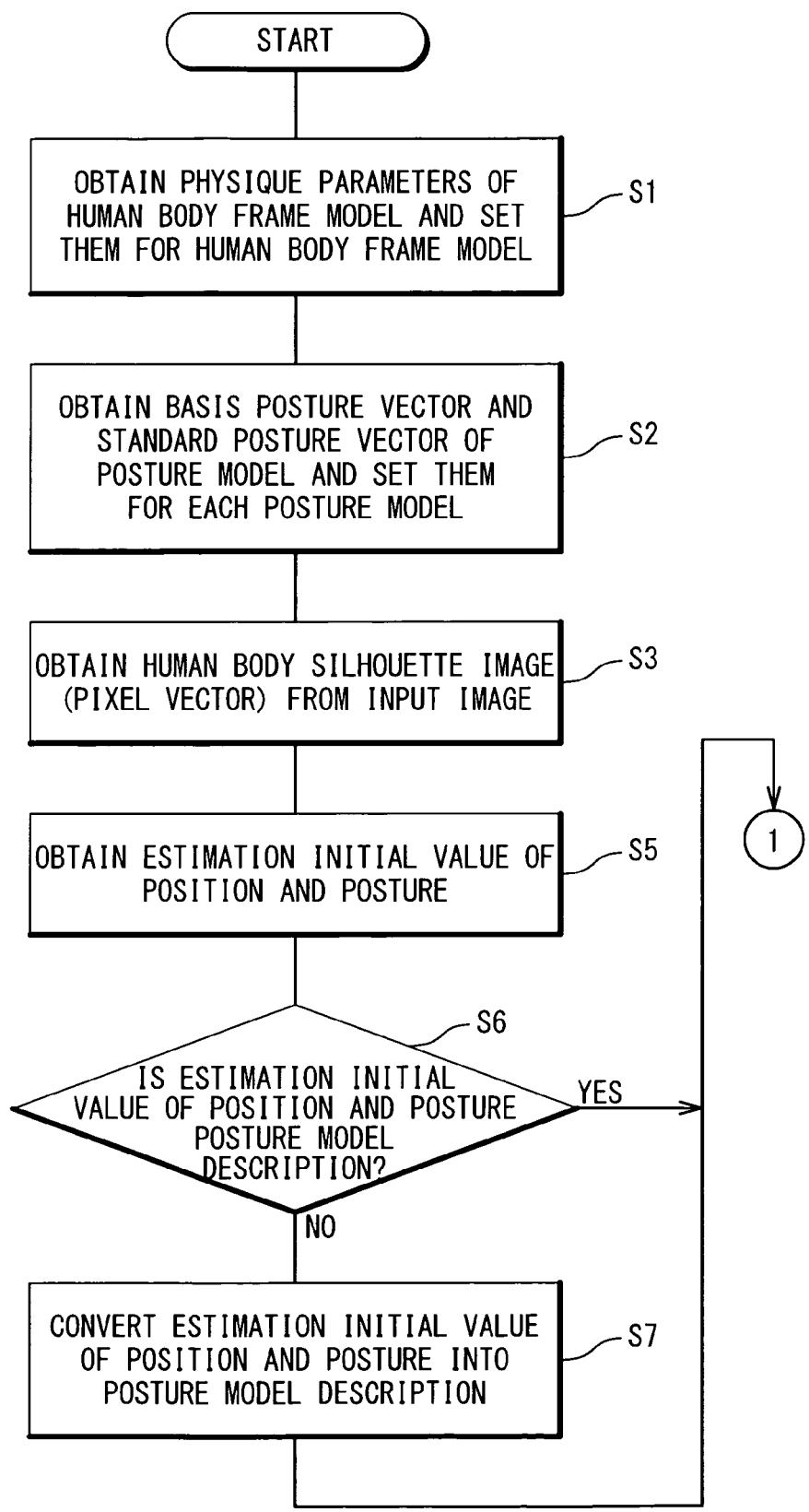
FIG. 4A is a flow chart illustrating an operation according to the first exemplary embodiment of the present invention.
Figure 4B:
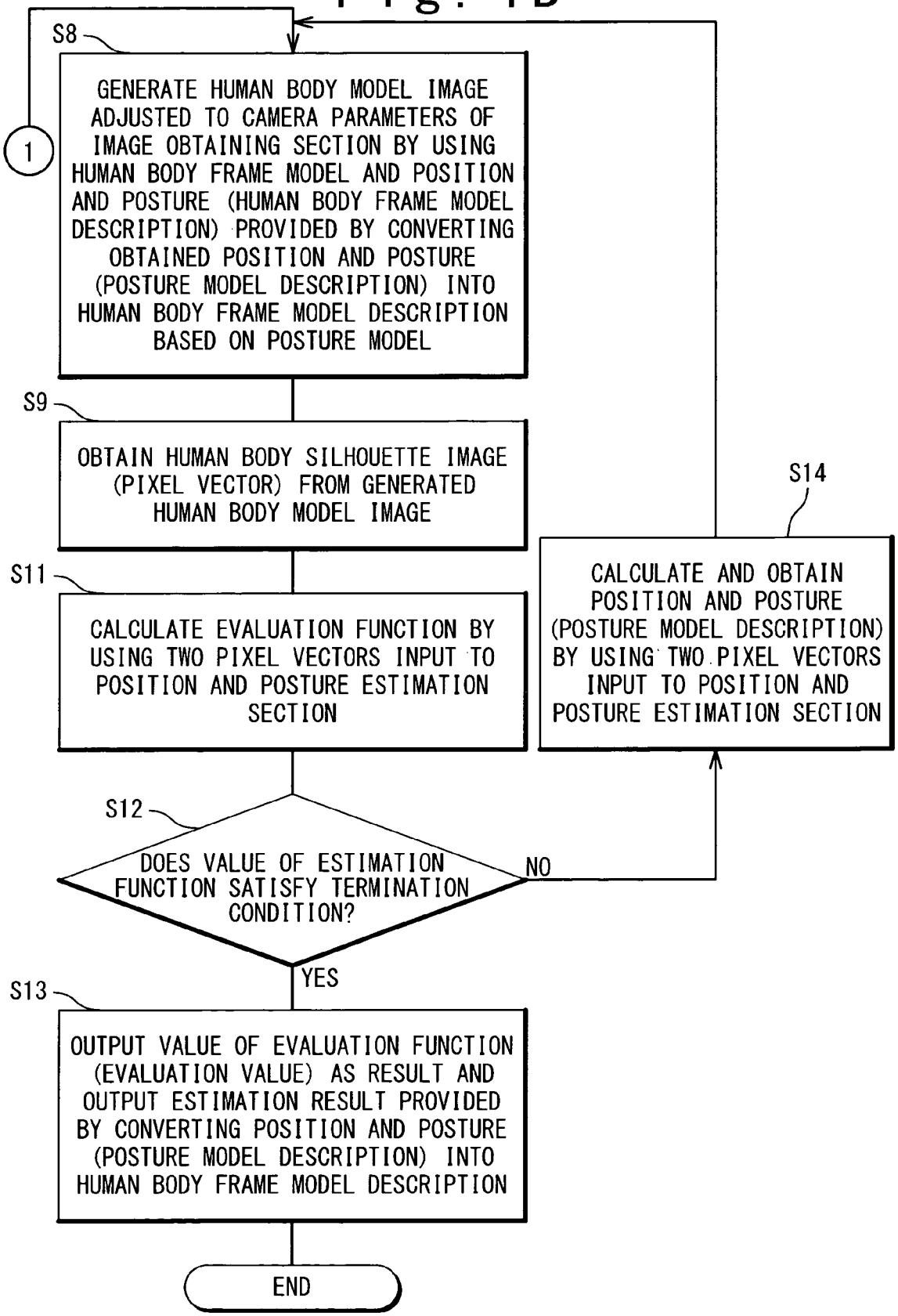
FIG. 4B is a flow chart illustrating the operation according to the first exemplary embodiment of the present invention.

Next, referring to FIGS. 1, 4A, and 4B, operation according to the present exemplary embodiment will be described in detail.

First, as preparation processing, the human body model image generation section 4 obtains physique parameters of the human body frame model from the human body frame model storage section 1 and sets them for the human body frame model (step S1). The input-judgment-involved position and posture description conversion section 5, and the position and posture description conversion sections 6A and 6B obtain the basis posture vectors and the standard posture vector of the posture model from the posture model storage section 2 and set them for each human body frame model (step S2).

When the input image obtained by the image obtaining section 7 is inputted to the human body position and posture estimation device 101, the following processing is executed.

First, the input image from the image obtaining section 7 is supplied to the human body silhouette obtaining section 8. The human body silhouette obtaining section 8 obtains the human body silhouette image (pixel vector) from the input image (step S3).

Next, the position and posture estimation initial value is obtained from the position and posture initial value storage section 3, and then supplied to the input-judgment-involved position and posture description conversion section 5 (step S5). Here, as a method of setting the position and posture estimation initial value, the following three examples are considered. In example (1), x according to the human body frame model description or x' according to the posture model description are manually set through GUI such that the both silhouettes are overlapped each other. In example (2), in the case of posture estimation based on dynamic image, from x according to the human body frame model description determined for the preceding frame, the next x according to the human body frame model description is linearly predicted. The value of the next x is set as initial posture. In example (3), in the case of x' according to the posture model description for movement for walking, p is automatically set such that x-coordinate of the center of the silhouette and the upper and lower portions of the silhouette are minimized, z-axis rotation of θ1 is set in the travel direction obtained simply from the moving direction of the center of the silhouette, other-axis rotations of θ1 are set at zero, first component λ1, which is the most influential among the coefficients λ, is set at, for example, ±30, and the other components are set at zero.

The input-judgment-involved position and posture description conversion section 5 checks whether the supplied position and posture estimation initial value is in the posture model description (step S6). In case of the posture model description, the input-judgment-involved position and posture description conversion section 5 supplies the position and posture estimation initial value with no conversion to the position and posture estimation section 10. In the case of the human body frame model description, the input-judgment-involved position and posture description conversion section 5 converts the position and posture estimation initial value into the posture model description and supplies the position and posture estimation initial value to the position and posture estimation section 10 (step S7).

Next, the position and posture estimation section 10 obtains the position and posture (posture model description) from the input-judgment-involved position and posture description conversion section 5 and supplies the position and posture (posture model description) directly to the position and posture description conversion section 6A. The position and posture description conversion section 6A converts the position and posture (posture model description) into the position and posture (human body frame model description) and then supplies the position and posture (human body frame model description) to the human body model image generation section 4. The human body model image generation section 4, based on the position and posture (human body frame model description), generates from the human body frame model a human body model image adjusted to the camera parameters of the image obtaining section 7 (step S8). The human body model image generated by the human body model image generation section 4 is supplied to the human body silhouette obtaining section 11. The human body silhouette obtaining section 11 obtains a human body silhouette image (pixel vector) from the human body model image (step S9). The human body silhouette obtaining section 11 outputs the human body silhouette image (pixel vector) to the position and posture estimation section 10.

The position and posture estimation section 10, by using the two pixel vectors inputted from the human body silhouette obtaining section 8 and the human body silhouette obtaining section 11, calculates the evaluation function (equation (7)) as the square of the magnitude of the difference of the pixel vectors (step S11). The position and posture estimation section 10 examines whether a value of the calculated evaluation function satisfies a termination condition indicating a minimum (step S12). If the termination condition is not satisfied, the position and posture estimation section 10 calculates the amount of correction of the position and posture (posture model description) through the optimization method such that the value of the evaluation function is minimized, and obtains a new position and posture (posture model description)(step S14). Then, the obtained position and posture (posture model description) are converted into position and posture (human body frame model description) and then supplied to the human body model image generation section 4 by the position and posture description conversion section 6A. Until the termination condition is satisfied, processing according to steps S8, S9, S11, S12, and S14 is repeated.

When the termination condition is satisfied, the position and posture estimation section 10 outputs the value of the evaluation function (evaluation value) and the position and posture (posture model description) at this time point as results to the position and posture description conversion section 6B. The position and posture description conversion section 6B converts the position and posture (posture model description) into position and posture (human body frame model description), and then outputs the position and posture (human body frame model description) as an estimation result of position and posture (step S13).

Next, advantages of the present exemplary embodiment will be described.

1) According to the present exemplary embodiment, calculation cost involved in model fitting for estimating the position and posture of a human body can be reduced, and the estimation speed can be improved.

A first reason is that the posture and position is estimated within range of limited movement by using the posture model derived from the limited movement, thus narrowing the adjustment range for the position and posture of the human body model, reducing in the calculation costs accordingly, and accelerating the estimation speed. A second reason is that the number of parameters for adjusting the position and posture of the human body model is reduced. More specifically, in the present exemplary embodiment, the position and posture (human body frame model description) indicated by the equation (3) is changed indirectly by changing position and posture (posture model description) indicated by the equation (6). In order to directly change the position and posture (human body frame model description) of the equation (3), 3(n−1) of parameters are required to be changed in reference to only $\theta_2$ to $\theta_n$. In contrast, as for the position and posture (posture model description), only $\lambda_j$ in the equation (6) is required to be changed. The number m of parameters for $\lambda_j$ can generally be made smaller than 3(n−1) through the principal component analysis. A third reason is that, since the human body frame model approximated with the rigid bodies, such as sphere or cylinder, is used in the present exemplary embodiment and each portion of a model is expressed precisely in the art for estimating position and posture of articulated object disclosed in "A Pose Estimation Method for an Articulated Object from its Silhouette Image", amount of calculation in the present exemplary embodiment is less than that in the art.

2) Even in the art for estimating position and posture of articulated object disclosed in "A Pose Estimation Method for an Articulated Object from its Silhouette Image", posture estimation within range of "limited movement" can reduce calculation cost. However, according to the present exemplary embodiment, calculation cost can be more efficiently reduced for the following reason.

When the "limited movement" is expressed according to the art for estimating position and posture of articulated object disclosed in "A Pose Estimation Method for an Articulated Object from its Silhouette Image", the articulation movable range is independently given for each of articulations. For example, when the "limited movement" is expressed for "movement for walking", a movable range of each of the articulations is evaluated for the movement for walking and the movable range is set for each articulation. Limiting the movable range in this manner permits a reduced combination of posture and reduces the calculation cost accordingly. However, many useless postures are included. Because, for example, as for the movement for walking, the posture when a hand and a leg of the same side simultaneously move forward can be excluded, but in the method of providing an articulation movable range independently for each articulation, such posture cannot be exclude. Contrarily, as for the present exemplary embodiment, through principal component analysis based on typical movement for walking in which a hand and a leg on the opposite sides simultaneously move forward, their relationship is expressed in the posture model, and therefore, for example, a posture in which the left leg moves forward when the left arm moves forward is excluded from the target of evaluation. This permits further reduction in the calculation cost and also reduction in estimation mistakes.

3) According to the present exemplary embodiment, estimation accuracy can be improved for an input image, as an estimation target, in which self-occlusion occurs.

The reason is that the posture and position is estimated within range of limited movement by using the posture model derived from the limited movement; therefore, when a posture is estimated based on a non-self-occlusion portion (visible portion), the posture of a self-occlusion portion (invisible portion hidden by the body) is limited. For example, in a case of a self-occlusion state in which a person walks from left to right of the camera with a left arm of the person hidden by a torso of the person, various postures can be imagined as the posture of the left arm. However, when the posture model is used, the posture of the left arm, due to the nature of the posture model, is limited by viewing other portions. That is, when posture estimation is performed on a portion other than the left arm, how the left arm is oriented is limited and estimated.

4) Position and posture estimation initial value can be described according to either of two description types, posture model description and human body frame model description. Because, the input-judgment-involved position and posture description conversion section 5 is provided.

The present exemplary embodiment, in which the position and posture is estimated within a range of limited movement, is especially effective in, for example, behavior monitoring for detecting the posture of the limited movement. Possible examples of such monitoring include: monitoring of a smoking at a nonsmoking area; monitoring of using a portable phone during driving a car.

Moreover, a modification example of the present invention is possible, in which a posture model corresponding to each of a plurality of movements is generated and saved in an external storage device and then the posture model is read appropriately from the external storage device to replace the data in the posture model storage section 2. This permits expansion of the range of limited movement. For example, repeat of process in which a posture is estimated by using all the posture models for one frame image in a video for which postures are desired to be estimated, the posture model of low evaluation value is excluded, and a posture is estimated in the same manner for the next frame image, permits estimation of posture of a wider range of movements.

Second Exemplary Embodiment

Next, a second exemplary embodiment of the present invention will be described in detail referring to the drawings.

Figure 5B:
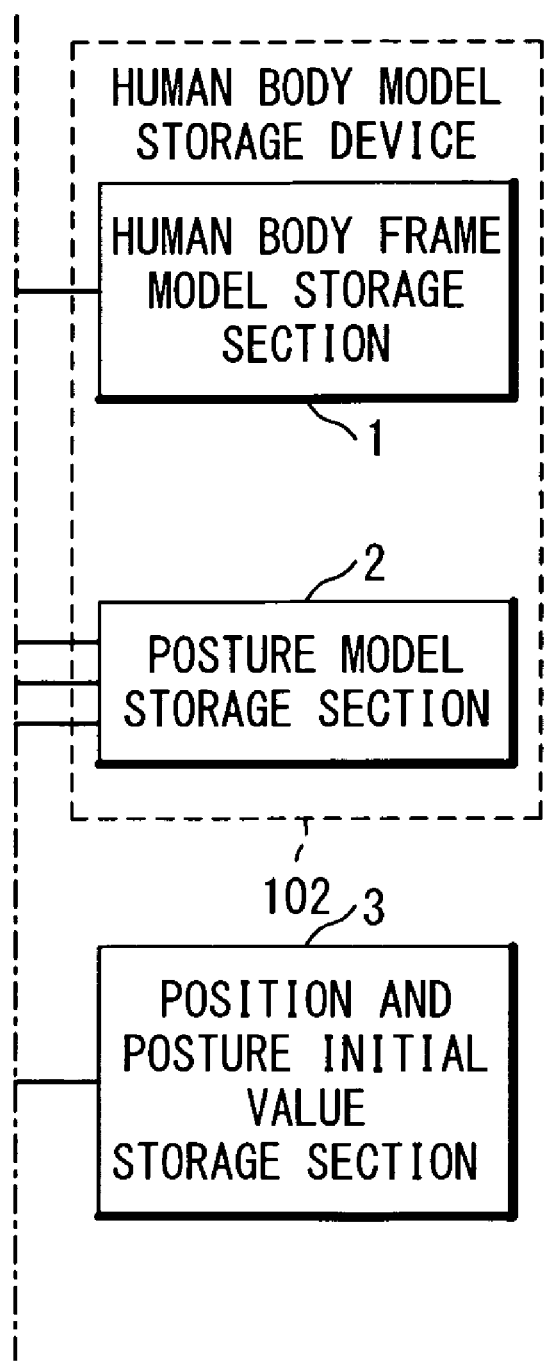

Referring to FIGS. 5A and 5B, an articulated object position and posture estimation device according to the second exemplary embodiment of the present invention differs from that of the first exemplary embodiment in the following points. Specifically, another image obtaining section 13 is provided which images the same object targeted for posture estimation from a viewpoint different from that of the image obtaining section 7. Accordingly, human body silhouette obtaining sections 14 and 15, and pixel vector connecting sections 16 and 17 are added. Moreover, a human body model image generation section 18 is provided instead of the human body model image generation section 4. The function of the human body model image generation section 18 is partially different from that of the human body model image generation section 4.

In terms of increasing effective image information applicable to posture estimation, the image obtaining section 13 images a person as the same posture target object from the viewpoint different from that of the image obtaining section 7. It is preferable that the view point from which the image obtaining section 13 images the person is largely different from the viewpoint from which the image obtaining section 7 images the person. The human silhouette obtaining section 14 obtains a human body silhouette image (pixel vector) from an input image from the image obtaining section 13 in the same method as is used by the human body silhouette obtaining section 8. The pixel vector connecting section 16 connects the pixel vectors inputted from the human silhouette obtaining section 8 and the human silhouette obtaining section 14 in a predetermined order to generate one pixel vector, and outputs it to the position and posture estimation section 10.

The human body model image generation section 18 generates a human body frame model based on the position and posture (human body frame model description) given by the equation (3) from the position and posture description conversion section 6A and the physique parameters stored in the human body frame model storage section 1. The human body model image generation section 18 generates a human body model image adjusted to the camera parameters of the image obtaining section 7 from the generated human body frame model and then outputs it to the human body silhouette obtaining section 11. The human body model image generation section 18 also generates a human body model image adjusted to camera parameters of the image obtaining section 13 from the generated human body frame model and then outputs it to the human body silhouette obtaining section 15. The human body silhouette obtaining section 15 obtains a human body silhouette image (pixel vector) from the human body model image generated by the human body model image generation section 18 in the same method as is used by the human body silhouette obtaining section 11. The pixel vector connecting section 17, by using the same method as is used by the pixel vector connecting section 16, connects the pixel vectors inputted from the human body silhouette obtaining section 11 and the human body silhouette obtaining section 15 to generate one pixel vector, and outputs it to the position and posture estimation section 10.

Other elements are identical to those according to the first exemplary embodiment.

Figure 6A:
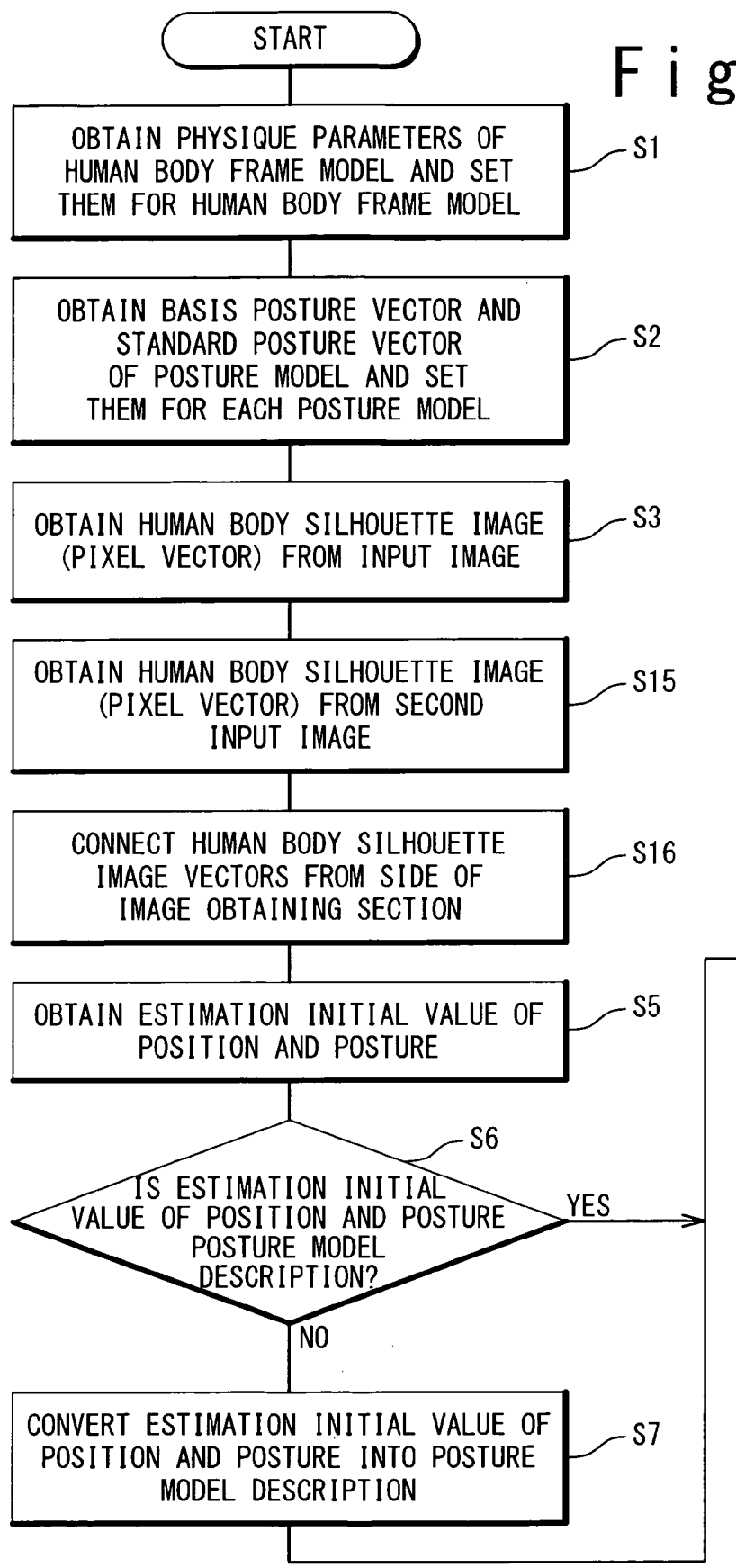
FIG. 6A is a flow chart illustrating an operation according to the second exemplary embodiment of the present invention.
Figure 6B:
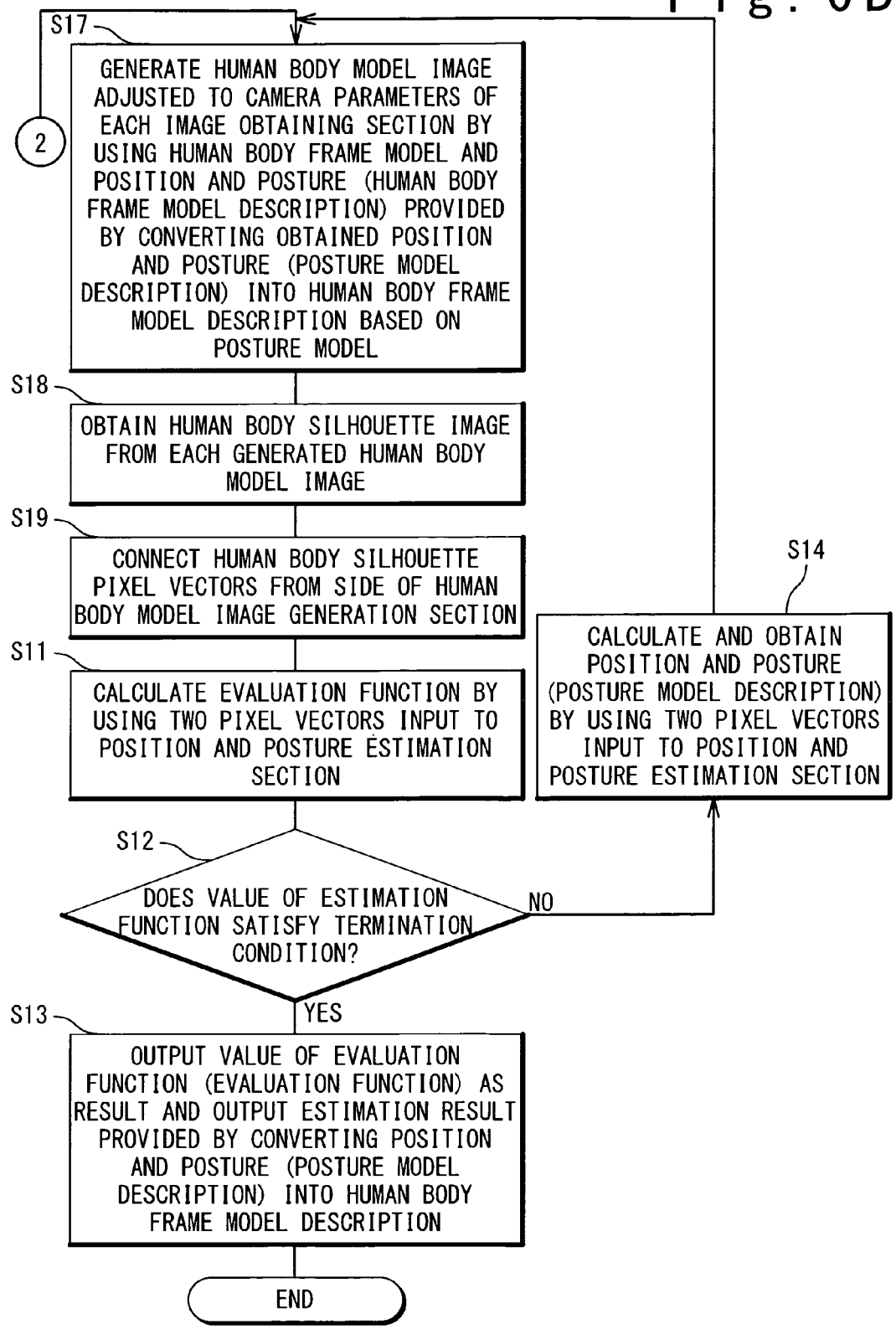
FIG. 6B is a flow chart illustrating the operation according to the second exemplary embodiment of the present invention.

Next, referring to FIGS. 5, 6A, and 6B, operation of the present exemplary embodiment will be described.

After the same preparation processing as in the first exemplary embodiment is performed (steps S1 and S2), input images obtained by the image obtaining sections 7 and 13 are inputted to the human body position and posture estimation device 103, whereby the following processing is executed.

First, the input image from the image obtaining section 7 and the input image from the image obtaining section 13 are supplied to the human body silhouette obtaining section 8 and the human body silhouette obtaining section 14, respectively, in each of which a human body silhouette image (pixel vector) is obtained (steps S3 and S15).

Next, the pixel vector connecting section 16 connects the pixel vectors obtained by the human body silhouette obtaining section 8 and the human body silhouette obtaining section 14 to generate one pixel vector, and then outputs this to the position and posture estimation section 10.

Next, position and posture estimation initial value is obtained from the position and posture initial value storage section 3, and then supplied to the input-judgment-involved position and posture description conversion section 5 (step S5). The input-judgment-involved position and posture description conversion section 5 checks whether the supplied position and posture estimation initial value is in the posture model description (step S6). In case of the posture model description, the input-judgment-involved position and posture description conversion section 5 supplies the position and posture estimation initial value with no conversion to the position and posture estimation section 10. In case of the human body frame model description, the input-judgment-involved position and posture description conversion section 5 converts it into the posture model description and then supplies it to the position and posture estimation section 10 (step S7).

Next, the position and posture estimation section 10, upon obtaining the position and posture (posture model description) from the input-judgment-involved position and posture description conversion section 5, supplies it directly to the position and posture description conversion section 6A. The position and posture description conversion section 6A converts the position and posture (posture model description) into position and posture (human body frame model description) and then supplies it to the human body model image generation section 18. Based on the position and posture (human body frame model description), the human body model image generation section 18 generates, from the human body frame model, a human body model image adjusted to the camera parameters of the image obtaining section 7 and a human body model image adjusted to the camera parameters of the image obtaining section 13 (step S17). The two human body model images generated by the human body model image generation section 18 are supplied to the human body silhouette obtaining sections 11 and 15, in each of which a human body silhouette image (pixel vector) is obtained (step S18) Each of the human body silhouette obtaining sections 11 and 15 outputs the obtained human body silhouette image (pixel vector) to the pixel vector connecting section 17.

Next, the pixel vector connecting section 17 connects the pixel vectors obtained by the human body silhouette obtaining section 11 and the human body silhouette obtaining section 15 to thereby generate one pixel vector, and then outputs this to the position and posture estimation section 10 (step S19).

The position and posture estimation section 10, by using the two pixel vectors inputted from the pixel vector connecting sections 16 and 17, calculates an evaluation function (equation (7)) (step S11). The evaluation function is expressed by the square of the magnitude of the difference between the pixel vectors. The position and posture estimation section 10 checks whether a value of the calculated evaluation function satisfies a termination condition indicating a minimum (step S12). If the termination condition is not satisfied, the position and posture estimation section 10 calculates the amount of correction of the position and posture (posture model description) through the optimization method such that the value of the evaluation function becomes minimum, and obtains new position and posture (posture model description)(step S14). Then the obtained position and posture (posture model description) is converted into position and posture (human body frame model description) by the position and posture description conversion section 6A and then supplied to the human body model image generation section 18. Until the termination condition is satisfied, processing according to steps S17, S18, S19, S11, S12, and S14 is repeated.

When the termination condition is satisfied, the position and posture estimation section 10 outputs the value of the evaluation function (evaluation value) and the position and posture (posture model description) at this time point as results to the position and posture description conversion section 6B. The position and posture description conversion section 6B converts the position and posture (posture model description) into position and posture (human body frame model description), and then outputs it as an estimation result of position and posture (step S13).

Next, the advantages of the present exemplary embodiment will be described.

According to the present exemplary embodiment, further improvement of the accuracy in the estimation of position and posture is provided in addition to the same advantages according to the first exemplary embodiment. The reason for this is that the pixel vector obtained by connecting the pixel vectors obtained through imaging by the two image obtaining sections 7 and 13 different each other in the view point have more image information effective to the estimation of position and posture than the pixel vector obtained through imaging by one image obtaining section.

As for the present exemplary embodiment, the case has been described in which the two image obtaining sections are used. However, the number of image obtaining sections is not limited, and thus three or more image obtaining sections may be used.

Third Exemplary Embodiment

Next, a third exemplary embodiment of the present invention will be described in detail referring to the drawings.

Figure 7:
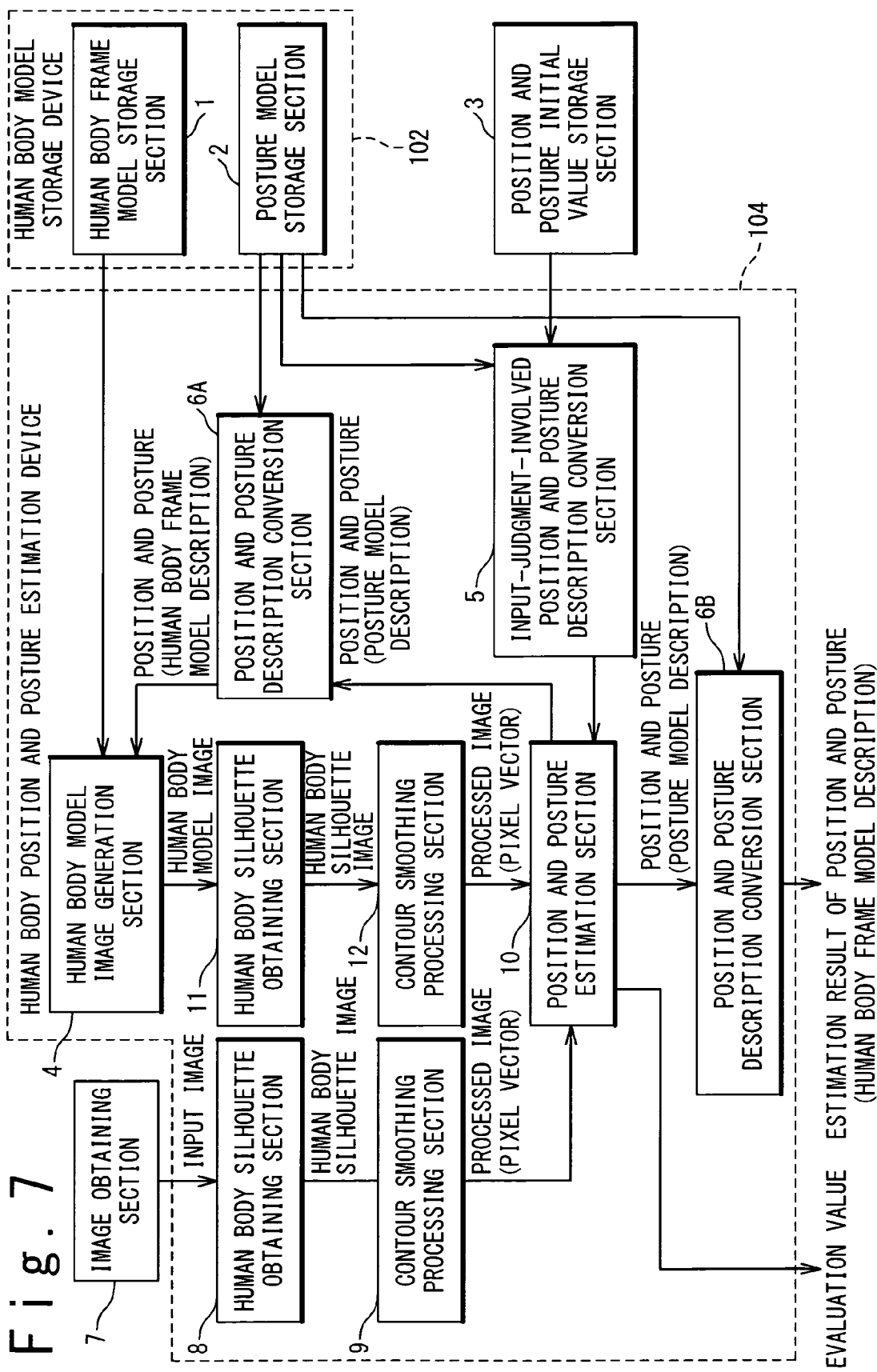
FIG. 7 is a block diagram according to a third exemplary embodiment of the present invention.

Referring to FIG. 7, an articulated object position and posture estimation device according to the third exemplary embodiment of the present invention differs from that of the first exemplary embodiment in the points that a contour smoothing processing section 9 is provided between the human body silhouette obtaining section 8 and the position and posture estimation section 10 and a contour smoothing processing section 12 is provided between the human body silhouette obtaining section 11 and the position and posture estimation section 10.

The contour smoothing processing section 9 performs blurring processing on a human body contour portion in the human body silhouette image obtained by the human body silhouette obtaining section 8, and then outputs the result as a processed image (pixel vector) to the position and posture estimation section 10. Similarly, the contour smoothing processing section 12 performs blurring processing on a human body contour portion in the human body silhouette image obtained by the human body silhouette obtaining section 11, and then outputs the result as a processed image (pixel vector) to the position and posture estimation section 10.

The details of processing performed by the contour smoothing processing sections 9 and 12 will be described referring to FIG. 8.

First, as shown in (a) of FIG. 8, an arbitrary contour pixel (noted contour pixel 601) of the human body silhouette image is noted, background image pixels (process target pixels 602) in the eight pixels around the noted contour pixel 601 are set at the brightness value calculated through the next equation (8).

$$\text{SET BRIGHTNESS VALUE} = \quad (8)$$
$$255 - \{255 / (\text{TOTAL NUMBER OF STEPS} + 1)\} \times \text{STEP No.}$$

Here, total number of steps is a fixed value, an initial value of Step No. is 1, and set brightness value is obtained through truncation in which digits right of the decimal point are discarded.

The processing described above is performed on the contour pixels 601 of all the human body silhouette images. In one step processing, the contour pixels 601 of all the human body silhouette images are processed. Next, the same step processing is performed for the processed images. This is repeated for the number of times equal to the set total number of steps. The step No. is defined to be 1 for the first step. The step No. is incremented every time the step processing proceeds.

An example of transition in the brightness values from before the contour smoothing processing to after the contour smoothing processing is shown in (b) and (c) in FIG. 8. As described above, the contour smoothing processing sections 9 and 12 provide blurring effect at high speed in a wide range without reducing information about the human body silhouette.

Operation according to the present exemplary embodiment will be described in detail referring to FIGS. 7, 9A, and 9B.

Figure 9A:
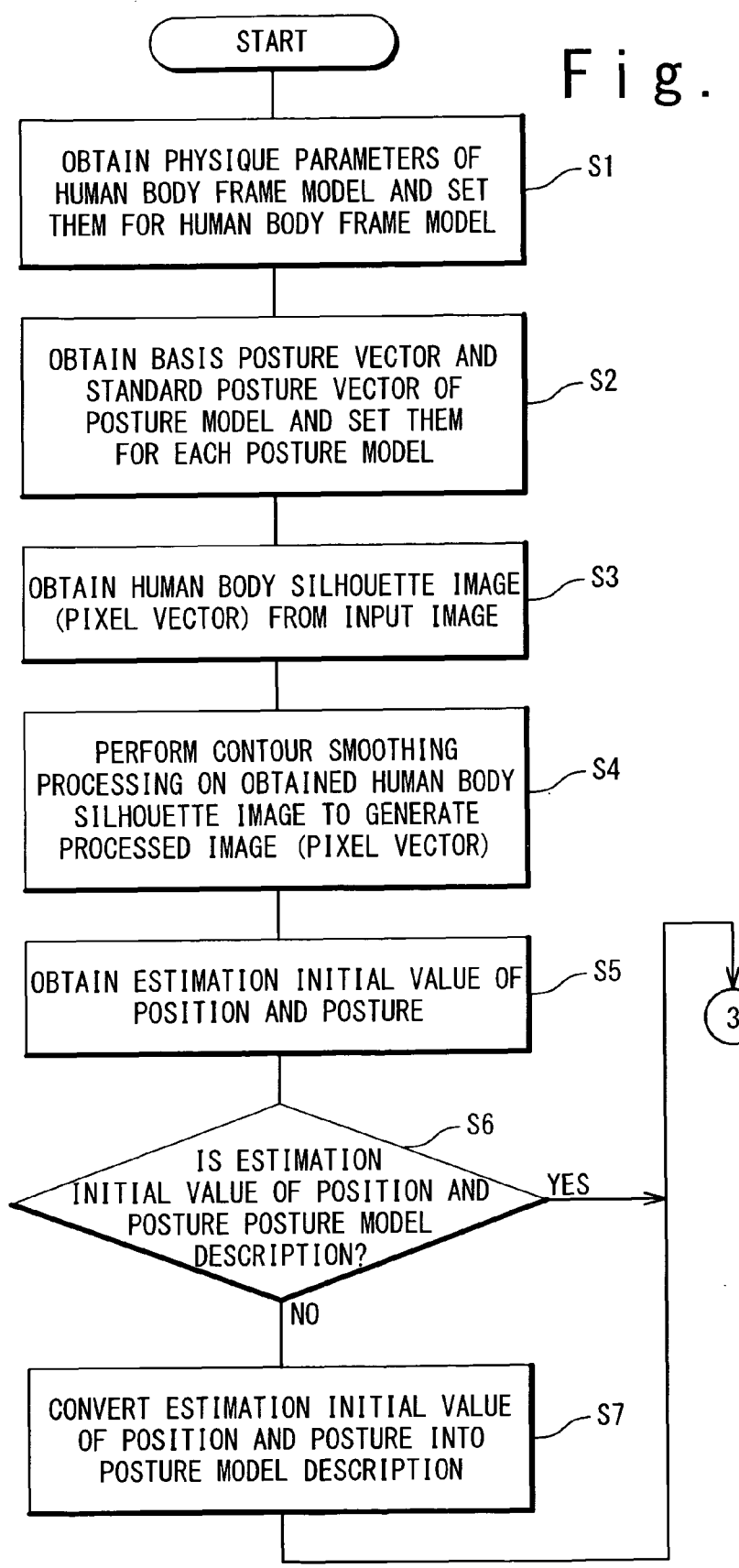
FIG. 9A is a flow chart illustrating an operation according to the third exemplary embodiment of the present invention.
Figure 9B:
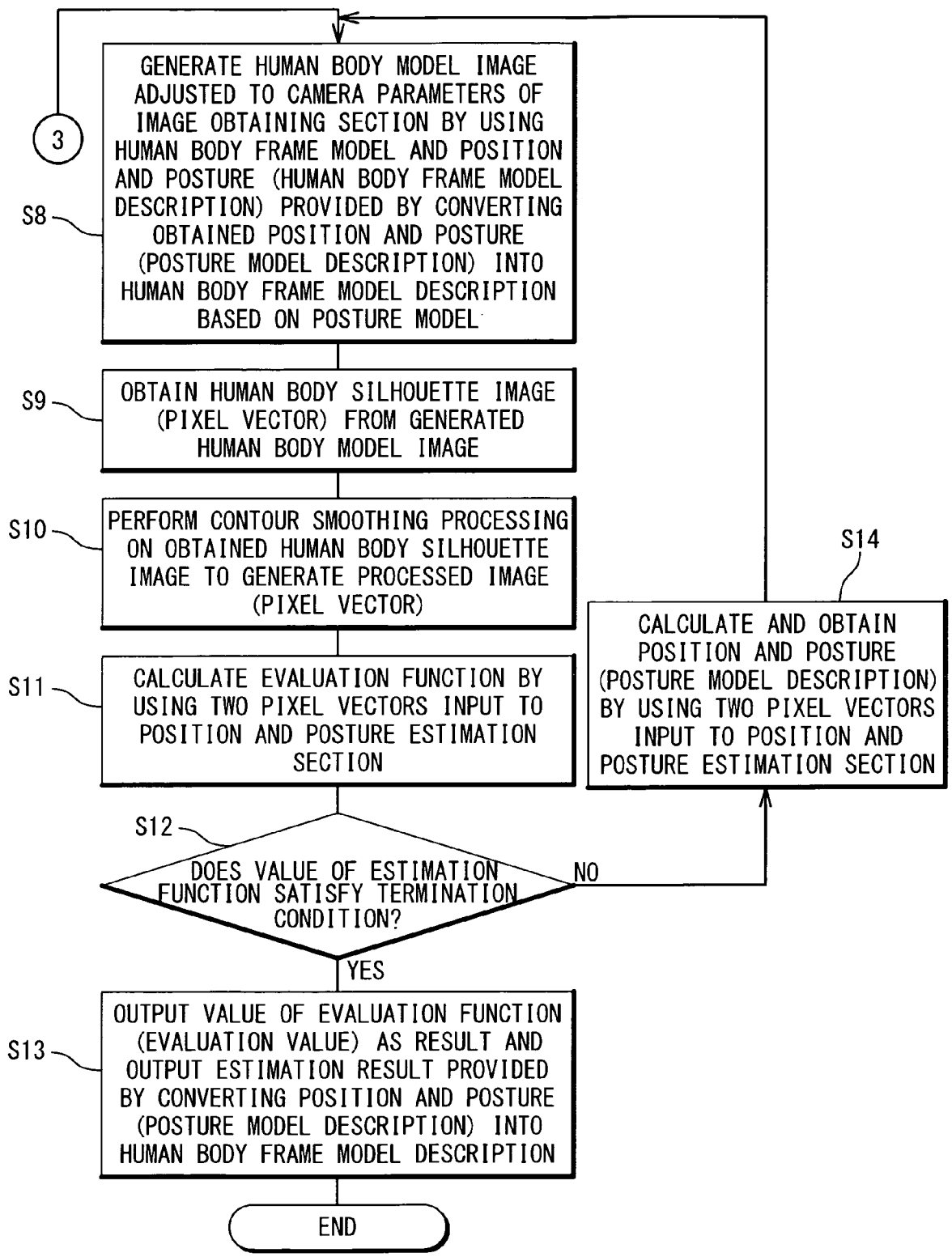
FIG. 9B is a flow chart illustrating the operation according to the third exemplary embodiment of the present invention.

Operations of the image obtaining section 7, the human body silhouette obtaining sections 8 and 11, the human body model image generation section 4, the position and posture estimation section 10, the input-judgment-involved position and posture description conversion section 5, and the position and posture description conversion sections 6A and 6B according to the present exemplary embodiment are illustrated by steps S1 to S3 and S5 to S7 of FIG. 9A and steps S8, S9, and S11 to S14 of FIG. 9B and identical to operations of the corresponding elements according to the first exemplary embodiment, and are thus omitted from the description.

In the first exemplary embodiment, the human body silhouette images (pixel vectors) obtained by the human body silhouette obtaining sections 8 and 11 are supplied to the position and posture estimation section 10. In the present exemplary embodiment, the human body silhouette image obtained by the human body silhouette obtaining section 8 is supplied to the contour smoothing processing section 9, and the human body silhouette image obtained by the human body silhouette obtaining section 11 is supplied to the contour smoothing processing section 12.

The contour smoothing processing section 9 performs the contour smoothing processing on the obtained human body silhouette image to generate a processed image (pixel vector) (step S4), and then supplies it to the position and posture estimation section 10.

The contour smoothing processing section 12 performs the contour smoothing processing on the obtained human body silhouette image to generate a processed image (pixel vector) (step S10), and then supplies it to the position and posture estimation section 10.

Next, advantages according to the present exemplary embodiment will be described.

According to the present exemplary embodiment, the same advantages according to the first exemplary embodiment are provided. In addition, since the contour smoothing processing is performed on the human body silhouette images, variation in physique is absorbed, and posture estimation can be performed on an arbitrary person and a human body whose physique has been changed even when physique parameters corresponding to an average physique are used as the physique parameters of the human body frame model. That is, an accurate model physique of the person as estimation target is not required. Moreover, the convergence rate in model fitting for the optimization method is improved. Further, the present exemplary embodiment provides the advantage of making initial posture robust.

Fourth Exemplary Embodiment

Next, a fourth exemplary embodiment of the present invention will be described in detail referring to the drawings.

Figure 10:
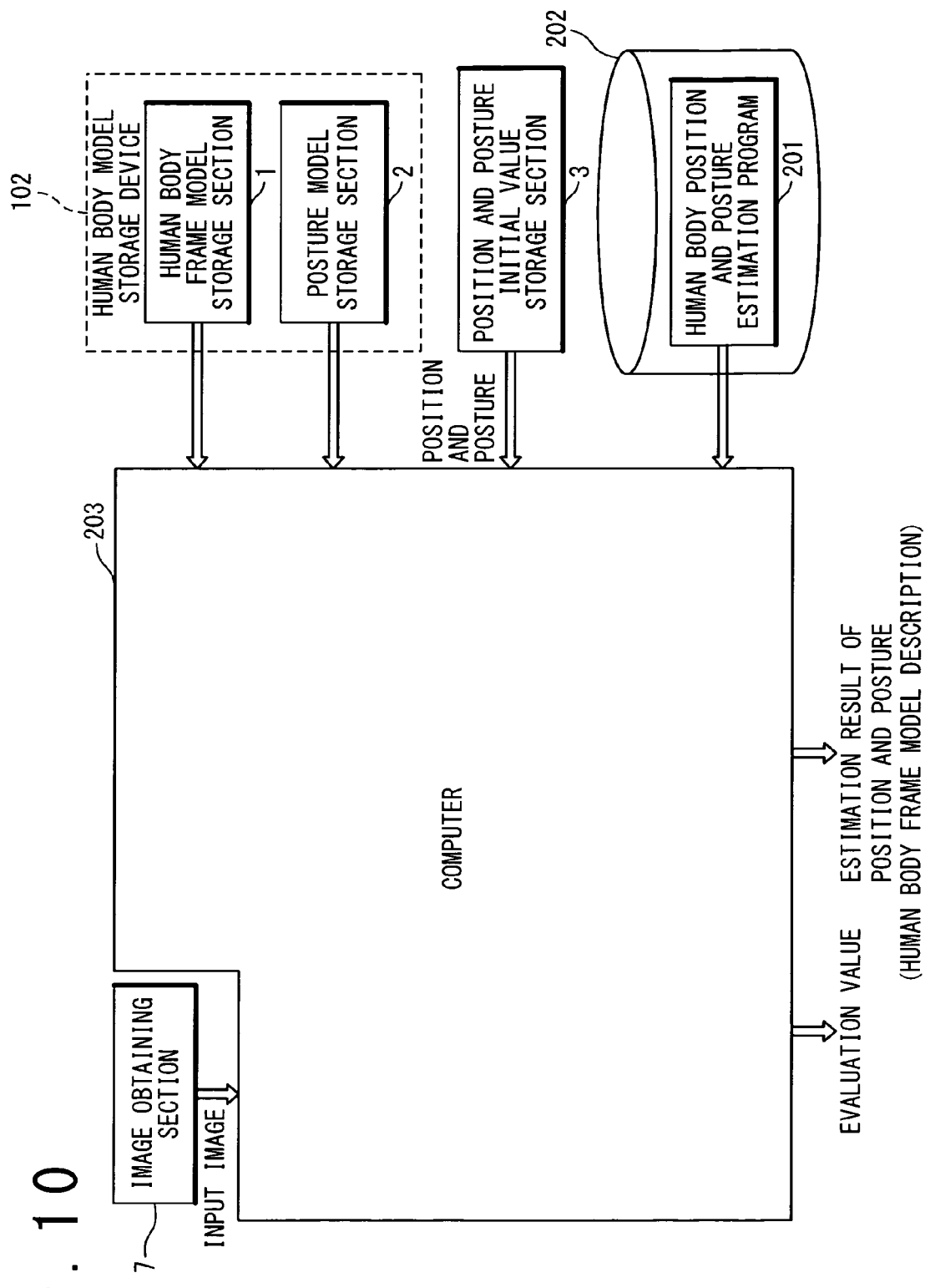
FIG. 10 is a block diagram according to a fourth exemplary embodiment of the present invention.

Referring to FIG. 10, an articulated object position and posture estimation device according to the forth exemplary embodiment of the present invention includes: an image obtaining section 7 identical to that according to the first exemplary embodiment; a human body model storage device 102; a position and posture initial value storage section 3; a computer 203; and a computer-readable recording medium 202 storing a human body position and posture estimation program 201. The image obtaining section 7, the human body model storage device 102, the position and posture initial value storage section 3, and the computer-readable recording medium 202 are connected to the computer 203. The human body model storage device 102 includes a human body frame model storage section 1 and a posture model storage section 2.

The computer-readable recording medium 202 includes a magnetic disk, a semiconductor memory, or the like. The computer 203 reads the human body position and posture estimation program 201 when the computer 203 starts. The human body position and posture estimation program 201, by controlling the operation of the computer 203, makes the computer 203 function as the elements 4, 5, 6A, 6B, 8, 10, and 11 included in the human body position and posture estimation device 101 according to the first exemplary embodiment described above, and also makes the computer 203 perform the processing shown in FIGS. 4A and 4B.

In the present exemplary embodiment, the articulated object position and posture estimation device according to the first exemplary embodiment is achieved with the computer and the program. The articulated object position and posture estimation devices according to the second and third exemplary embodiments can also be achieved with a computer and a program.

The exemplary embodiments of the present invention have been described above, but the present invention is not limited to the examples provided above. Thus, various other addition and modification can be made thereto. For example, the position and posture of a human body is estimated in each the above exemplary embodiments; however, the present invention is not limited thereto and thus is widely applicable to articulated objects such as dogs, cats, insects, etc. Moreover, images inputted from the image obtaining sections are used as processing targets, but images accumulated in an image accumulation section, computer graphic images, or the like can also be used as processing target.

The above exemplary embodiments are applicable to applications such as an articulated object position and posture estimation device for estimating the three-dimensional position and posture of an articulated object such as a human body based on a camera or its accumulated video therein, or a program for achieving the articulated object position and posture estimation device with a computer. Moreover, these exemplary embodiments are also applicable to human behavior analysis, suspicious individual detection, missing child search or the like in a monitoring field that requires the three-dimensional position and posture of an articulated object such as a human body based on a camera or its accumulated video. Furthermore, the exemplary embodiments are applicable to applications such as avatar motion synthesis for a virtual reality world or a remote control interface of a machine, in which the three-dimensional position and posture of an articulated object based on a camera or its accumulated video is used as an input. In addition, the exemplary embodiments are applicable to an application of video search in which the three-dimensional posture and position of an articulated object or the movement of the articulated object is used as a search key.

The invention claimed is:

1. An articulated object position and posture estimation device comprising:
   a storage section configured to store data concerning to a posture model with low-dimensional parameters under movement restraint, wherein said low-dimensional parameters are obtained by performing principal component analysis on time-series postures of an articulated object frame model corresponding to a predetermined limited movement; and
   a position and posture estimation device configured to generate an image of each posture of said articulated object frame model within postures which can be taken by said posture model and to perform a matching with an estimation target articulated object image to estimate a posture.

2. The articulated object position and posture estimation device according to claim 1, wherein said data concerning to said posture model includes an average posture of said time-series postures and basis posture vectors as eigenvectors obtained in said principal component analysis.

3. The articulated object position and posture estimation device according to claim 1, wherein said position and posture estimation device includes:
   a conversion section configured to convert a posture description according to said posture model into a posture description according to said articulated object frame model;
   a model image generation section configured to generate a image of said articulated object frame model adjusted to a posture indicated by said posture description converted by said conversion section;
   a silhouette obtaining section configured to generate from said image of said articulated object frame model generated by said model image generation section a image to be used in said matching with said estimation target articulated object image; and
   a position and posture estimation section configured to change said posture description according to said posture model to be given to said conversion section such that said image generated by said silhouette obtaining section and said estimation target articulated object image match with each other.

4. The articulated object position and posture estimation device according to claim 1, wherein said position and posture estimation device is configured to obtain as said articulated object image a first plurality of pixel vectors from a plurality of images obtained by imaging an estimation target articulated object from different view points, to generate a first connected pixel vector by connecting said first plurality of pixel vectors, to obtain a second plurality of pixel vectors from a plurality of images of said articulated frame model corresponding to for said view points, to generate a second connected pixel vector by connecting said second plurality of pixel vectors and to estimate said posture through matching between said first connected pixel vector and said second connected pixel vector.

5. The articulated object position and posture estimation device according to claim 4, wherein said position and posture estimation device performs a matching between said first connected pixel vector and said second connected pixel vector by using an optimization method.

6. The articulated object position and posture estimation device according to claim 1, wherein said position and posture estimation device includes a contour smoothing processing section configured not to perform a blurring processing toward inside from contours of articulated object images in both images on which said matching is performed but to perform a blurring processing toward outside from said contours such that positions of said contours are not changed.

7. The articulated object position and posture estimation device according to claim 1, wherein said time-series postures includes data set obtained by subtracting an average posture vector from each of a plurality of posture vectors indicating time-series postures of each articulated object, and
said average vector is an average of said plurality of posture vectors.

8. The articulated object position and posture estimation device according to claim 1, wherein said articulated frame model has a tree structure,
said articulated frame model includes a root portion and another portion, and
said time-series postures do not include position and posture of said root portion but include a posture of said another portion.

9. An articulated object position and posture estimation device comprising:
an articulated object frame model storage section configured to store as a physique parameter a size of rigid body of each portion of an articulated object frame model provided by modeling an articulated object based on a multi-articulated object tree structure with rigid bodies;
a posture model storage section configured to store basis posture vectors and a standard posture vector of a posture model modeled with low-dimensional parameters under movement restraint obtained through principal component analysis on time-series postures of said articulated object frame model, wherein said time-series postures correspond to a predetermined limited movement of a plurality of articulated object;
a position and posture initial value storage section configured to store a position and posture estimation initial value;
an image obtaining section configured to obtain an input image of a target articulated object;
a first articulated object silhouette obtaining section configured to obtain an articulated object silhouette image (pixel vector) from said input image;
an input-judgment-involved position and posture description conversion section configured to obtain said position and posture estimation initial value from said position and posture initial value storage section and to judge a description type of said position and posture estimation initial value, wherein said input-judgment-involved position and posture description conversion section is configured not to convert said description type in case of a posture model description and to convert said description type into said posture model description by using said posture model in case of an articulated object model description;

an articulated object model image generation section configured to, based on position and posture (posture model description), generate an articulated object model image adjusted to camera parameters of said image obtaining section from said posture model and said articulated object frame model;
a second articulated object silhouette obtaining section configured to obtain an articulated object silhouette image (pixel vector) from said articulated object model image;
a position and posture estimation section configured to calculate an evaluation function by using said two pixel vectors inputted, to repeat an estimation of said position and posture (posture model description) through an optimization method such that a value of said estimation function is minimized and to output final estimation results as an evaluation value and said position and posture (posture model description), wherein said estimation function is expressed by an square of magnitude of a difference between said pixel vectors; and
a position and posture description conversion section configured to convert said position and posture (posture model description) as an estimation result into said articulated object frame model description.

10. An articulated object position and posture estimation device comprising:
an articulated object frame model storage section configured to store as a physique parameter a size of rigid body of each portion of an articulated object frame model provided by modeling an articulated object based on a multi-articulated object tree structure with rigid bodies;
a posture model storage section configured to store basis posture vectors and a standard posture vector of a posture model modeled with low-dimensional parameters under movement restraint obtained through principal component analysis on time-series postures of said articulated object frame model, wherein said time-series postures correspond to predetermined limited movements of a plurality of articulated object;
a position and posture initial value storage section configured to store a position and posture estimation initial value;
a first image obtaining section configured to obtain an input image of a target articulated object;
a second image obtaining section configured to obtain another input image of said target articulated object;
a first articulate object silhouette obtaining section configured to obtain a first pixel vector from said input image from said first image obtaining section;
a second articulated object silhouette obtaining section configured to obtain a second pixel vector from said another input image from said second image obtaining section;
a first pixel vector connecting section configured to connects said first pixel vector and said second pixel vector in a determined order to provide a first connected pixel vector;
an input-judgment-involved position and posture description conversion section configured to obtain said position and posture estimation initial value from said position and posture initial value storage section and to judge a description type of said position and posture estimation initial value, wherein said input-judgment-involved position and posture description conversion section is configured not to convert said description type in case of a posture model description and to convert said description type into said posture model description by using said posture model in case of an articulated object model description;

an articulated object model image generation section configured to, based on position and posture (posture model description), generate articulated model images adjusted to camera parameters of said two image obtaining sections from said posture model and said articulated frame model;

a third articulated object silhouette obtaining section configured to obtain a third pixel vector from one of said articulated model images;

a forth articulated object silhouette obtaining section configured to obtain a forth pixel vector from another of said articulated model images;

a second pixel vector connecting section configured to connects said third pixel vector and said forth pixel vector in said predetermined order to provide a second connected pixel vector;

a position and posture estimation section configured to calculate an evaluation function expressed by an square of magnitude of a difference between said first connected pixel vector and said second connected pixel vector, to repeat an estimation of said position and posture (posture model description) through an optimization method such that a value of said estimation function is minimized and to output final estimation results as an evaluation value and said position and posture (posture model description); and a position and posture description conversion section configured to convert said position and posture (posture model description) as an estimation result into said articulated object frame model description.

11. An articulated object position and posture estimation device comprising:

an articulated object frame model storage section configured to store as a physique parameter a size of rigid body of each portion of an articulated object frame model provided by modeling an articulated object based on a multi-articulated object tree structure with rigid bodies;

a posture model storage section configured to store basis posture vectors and a standard posture vector of a posture model modeled with low-dimensional parameters under movement restraint obtained through principal component analysis on time-series postures of said articulated object frame model, wherein said time-series postures correspond to predetermined limited movements of a plurality of articulated object;

a position and posture initial value storage section configured to store a position and posture estimation initial value;

an image obtaining section configured to obtain an input image of a target articulated object;

a first articulated object silhouette obtaining section configured to obtain a first articulated object silhouette image (pixel vector) from said input image;

a first contour smoothing processing section configured to generate a processed image (first pixel vector) by not performing a blurring processing toward inside from a contour of said first articulated object silhouette image but by performing a blurring processing toward outside from said contour such that a position of said contour is not changed;

an input-judgment-involved position and posture description conversion section configured to obtain said position and posture estimation initial value from said position and posture initial value storage section and to judge a description type of said position and posture estimation initial value, wherein said input-judgment-involved position and posture description conversion section is configured not to convert said description type in case of a posture model description and to convert said description type into said posture model description by using said posture model in case of an articulated object model description;

an articulated object frame model image generation section configured to, based on position and posture (posture model description), generate an articulated model image adjusted to camera parameters of said image obtaining section from said posture model and said articulated frame model;

a second articulated object silhouette obtaining section configured to obtain a second articulated object silhouette image (pixel vector) from said articulated object image;

a second contour smoothing processing section configured to generate a processed image (second pixel vector) by not performing a blurring processing toward inside from a contour of said second articulated object silhouette image but by performing a blurring processing toward outside from said contour such that a position of said contour is not changed;

a position and posture estimation section configured to calculate an evaluation function expressed by an square of magnitude of a difference between said first pixel vector and said second pixel vector, to repeat an estimation of said position and posture (posture model description) through an optimization method such that a value of said estimation function is minimized and to output final estimation results as an evaluation value and said position and posture (posture model description); and a position and posture description conversion section configured to convert said position and posture (posture model description) as an estimation result into said articulated object frame model description.

12. An articulated object position and posture estimation device comprising:

a storage section configured to store a standard posture vector and a basis posture vector group; and a position and posture estimation device configured to estimate a posture of an estimation target articulated object by using a posture model expressed by a linear combination of said standard posture vector and said basis posture vector group, wherein for each of a plurality of cases different in physique parameters indicating sizes of portions of an articulated object frame model, a plurality of posture vectors are obtained which indicate time-series postures of said articulated object frame model corresponding to a predetermined movement of an articulated object, for each of said plurality of cases, a data set is obtained by subtracting an average posture vector as an average of said plurality of posture vectors from each of said plurality of posture vectors, said basis posture vector group is obtained as an eigenvector group by performing a principal component analysis on a set of said data set corresponding to a whole of said plurality of cases, said standard posture vector is obtained as an average in a set of said plurality of posture vectors corresponding to said whole of said plurality of cases, and said position and posture estimation device is configured to obtain an articulated object silhouette image based on said posture model and said articulated object frame model, to obtain an estimation target articulated object silhouette image as a silhouette image of said estimation target articulated object, and to change an coefficient group of said basis posture vector group in said linear combination such that said articulated object silhouette image and said estimation target articulated object silhouette image match with each other.

13. An articulated object position and posture estimation method comprising:
a position and posture estimation device reading out from a storage section a data concerning to a posture model with low-dimensional parameters under movement restraint obtained through principal component analysis on time-series postures of an articulated frame model, wherein said time-series postures correspond to a predetermined limited movement of an articulated object frame model; and
estimating a posture by generating an image of each posture of said articulated object frame model within a range of postures which can be taken by said posture model and by performing a matching with a target articulated object image.

14. The articulated object position and posture estimation method according to claim 13, wherein said data concerning to said posture model includes an average posture of said time-series postures and basis posture vectors as eigenvectors obtained in said principal component analysis.

15. The articulated object position and posture estimation method according to claim 13, wherein said position and posture estimation device converts a posture description according to said posture model into a posture description according to said articulated object frame model, generates a image of said articulated frame model adjusted to a posture indicated by said converted posture description, generates a image used for said matching with said target articulated object image from said generated image of said articulated object frame model and changes said posture description according to said posture model such that said generated image and said estimation target articulated object image match with each other.

16. The articulated object position and posture estimation method according to claim 13, wherein said position and posture estimation device obtains as said articulated object image a first plurality of pixel vectors from a plurality of images obtained by imaging an estimation target articulated object from different view points, generates a first connected pixel vector by connecting said first plurality of pixel vectors, obtains a second plurality of pixel vectors from a plurality of images of said articulated frame model corresponding to said view points, generates a second connected pixel vector by connecting said second plurality of pixel vectors and estimates said posture through matching between said first connected pixel vector and said second connected pixel vector.

17. The articulated object position and posture estimation method according to claim 16, wherein said position and posture estimation device performs a matching between said first connected pixel vector and said second connected pixel vector by using an optimization method.

18. The articulated object position and posture estimation method according to claim 16, wherein said position and posture estimation device does not perform a blurring processing toward inside from contours of articulated object images in both images on which said matching is performed but performs a blurring processing toward outside from said contours such that positions of said contours are not changed.

19. The articulated object position and posture estimation method according to claim 13, wherein said time-series postures includes data set obtained by subtracting an average posture vector from each of a plurality of posture vectors indicating time-series postures of each articulated object, and said average vector is an average of said plurality of posture vectors.

20. The articulated object position and posture estimation method according to claim 13, wherein said articulated frame model has a tree structure,
said articulated frame model includes a root portion and another portion, and
said time-series postures do not include position and posture of said root portion but include a posture of said another portion.

21. An articulated object position and posture estimation method comprising:
obtaining a standard posture vector and a basis posture vector group; and
estimating a posture of an estimation target articulated object by using a posture model expressed by a linear combination of said standard posture vector and said basis posture vector group,
wherein said obtaining said standard posture vector and said basis posture vector group includes:
for each of a plurality of cases different in physique parameters indicating sizes of portions of an articulated object frame model, obtaining a plurality of posture vectors indicating time-series postures of said articulated object frame model corresponding to a predetermined movement of an articulated object;
for each of said plurality of cases, obtaining a data set by subtracting an average posture vector as an average of said plurality of posture vectors from each of said plurality of posture vectors;
obtaining said basis posture vector group as an eigenvector group by performing a principal component analysis on a set of said data set corresponding to a whole of said plurality of cases; and
obtaining said standard posture vector as an average in a set of said plurality of posture vectors corresponding to said whole of said plurality of cases, and
said estimating said posture includes:
obtaining an articulated object silhouette image based on said posture model and said articulated object frame model;
obtaining an estimation target articulated object silhouette image as a silhouette image of said estimation target articulated object; and
changing an coefficient group of said basis posture vector group in said linear combination such that said articulated object silhouette image and said estimation target articulated object silhouette image match with each other.

22. A computer program product for a computer to function as a position and posture estimation section, wherein said computer includes a storage section configured to store data concerning to a posture model with low-dimensional parameters under movement restraint,
said low-dimensional parameters are obtained by performing principal component analysis on time-series postures of an articulated object frame model corresponding to a predetermined limited movement, and
said position and posture estimation section generates an image of each posture of said articulated object frame model within postures which can be taken by said posture model and performs a matching with an estimation target articulated object image to estimate a posture.

23. The computer program product according to claim 22, wherein said data concerning to said posture model includes an average posture of said time-series postures and basis posture vectors as eigenvectors obtained in said principal component analysis.

24. The computer program product according to claim 22, wherein said position and posture estimation section includes:
- a conversion section which converts a posture description according to said posture model into a posture description according to said articulated object frame model;
- a model image generation section which generates an image of said articulated object frame model adjusted to a posture indicated by said posture description converted by said conversion section;
- a silhouette obtaining section which generates from said image of said articulated object frame model generated by said model image generation section a image to be used in said matching with said estimation target articulated object image; and
- a position and posture estimation section which changes said posture description according to said posture model to be given to said conversion section such that said image generated by said silhouette obtaining section and said estimation target articulated object image match with each other.

25. The computer program product according to claim 22, wherein said position and posture estimation section obtains as said articulated object image a first plurality of pixel vectors from a plurality of images obtained by imaging an estimation target articulated object from different view points, generates a first connected pixel vector by connecting said first plurality of pixel vectors, obtains a second plurality of pixel vectors from a plurality of images of said articulated frame model corresponding to said view points, generates a second connected pixel vector by connecting said second plurality of pixel vectors and estimates said posture through matching between said first connected pixel vector and said second connected pixel vector.

26. The computer program product according to claim 25, wherein said position and posture estimation section performs a matching between said first connected pixel vector and said second connected pixel vector by using an optimization method.

27. The computer program product according to claim 22, wherein said position and posture estimation section does not perform a blurring processing toward inside from contours of articulated object images in both images on which said matching is performed but performs a blurring processing toward outside from said contours such that positions of said contours are not changed.

28. The computer program product according to claim 22, wherein said time-series postures includes data set obtained by subtracting an average posture vector from each of a plurality of posture vectors indicating time-series postures of each articulated object, and
said average vector is an average of said plurality of posture vectors.

29. The computer program product according to claim 22, wherein said articulated frame model has a tree structure,
said articulated frame model includes a root portion and another portion, and
said time-series postures do not include position and posture of said root portion but include a posture of said another portion.

30. A computer program product for a computer to execute an articulated object position and posture estimation method which comprises:
obtaining a standard posture vector and a basis posture vector group; and
estimating a posture of an estimation target articulated object by using a posture model expressed by a linear combination of said standard posture vector and said basis posture vector group,
wherein said obtaining said standard posture vector and said basis posture vector group includes:
for each of a plurality of cases different in physique parameters indicating sizes of portions of an articulated object frame model, obtaining a plurality of posture vectors indicating time-series postures of said articulated object frame model corresponding to a predetermined movement of an articulated object;
for each of said plurality of cases, obtaining a data set by subtracting an average posture vector as an average of said plurality of posture vectors from each of said plurality of posture vectors;
obtaining said basis posture vector group as an eigenvector group by performing a principal component analysis on a set of said data set corresponding to a whole of said plurality of cases; and
obtaining said standard posture vector as an average in a set of said plurality of posture vectors corresponding to said whole of said plurality of cases, and
said estimating said posture includes:
obtaining an articulated object silhouette image based on said posture model and said articulated object frame model;
obtaining an estimation target articulated object silhouette image as a silhouette image of said estimation target articulated object; and
changing an coefficient group of said basis posture vector group in said linear combination such that said articulated object silhouette image and said estimation target articulated object silhouette image match with each other.

* * * * *